(12) United States Patent
Dahl et al.

(10) Patent No.: US 7,653,085 B2
(45) Date of Patent: Jan. 26, 2010

(54) METHODS AND APPARATUS FOR ENHANCED DELIVERY OF CONTENT OVER DATA NETWORK

(75) Inventors: Sten Jorgen Dahl, San Diego, CA (US); Devarshi Shah, San Diego, CA (US); Bharat Iyer, Boulder, CO (US); Prasanna Kannan, San Diego, CA (US); Bruce Collins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 677 days.

(21) Appl. No.: 11/400,438

(22) Filed: Apr. 7, 2006

(65) Prior Publication Data

US 2006/0262748 A1  Nov. 23, 2006

Related U.S. Application Data

(60) Provisional application No. 60/669,406, filed on Apr. 8, 2005, provisional application No. 60/720,000, filed on Sep. 23, 2005.

(51) Int. Cl.
*H04J 3/16* (2006.01)

(52) U.S. Cl. .................. 370/468; 370/208; 370/210; 370/329

(58) Field of Classification Search ............... None
See application file for complete search history.

(56) References Cited

U.S. PATENT DOCUMENTS

| | | | |
|---|---|---|---|
| 6,895,410 B2 | 5/2005 | Ridge | |
| 7,406,202 B2 | 7/2008 | Kodama et al. | |
| 2002/0163933 A1* | 11/2002 | Benveniste | 370/465 |
| 2003/0013451 A1* | 1/2003 | Walton | 455/447 |
| 2003/0093515 A1 | 5/2003 | Kauffman | |
| 2003/0123425 A1* | 7/2003 | Walton et al. | 370/341 |
| 2003/0156553 A1* | 8/2003 | Benveniste | 370/317 |
| 2003/0174664 A1* | 9/2003 | Benveniste | 370/317 |

(Continued)

FOREIGN PATENT DOCUMENTS

WO  02082743  10/2002

(Continued)

OTHER PUBLICATIONS

TIA-1099, Foward Link Only Air Interface Specification for Terrestrial Mobile Multimedia Multicase, Oct. 2006.

(Continued)

*Primary Examiner*—Bob A Phunkulh
(74) *Attorney, Agent, or Firm*—Gerald P. Joyce, III

(57) ABSTRACT

Methods and apparatus for enhanced delivery of content over a data network. In an aspect, a method is provided for transmitting services over a network. The method includes receiving one or more services having associated delivery requirements, determining that network bandwidth is available to meet the delivery requirements, and allocating the network bandwidth to the one or more services based on the delivery requirements to produce network bandwidth allocations. In an aspect, an apparatus is provided that includes receiving logic configured to receive one or more services having associated delivery requirements, and multiplexer logic configured to determine that network bandwidth is available to meet the delivery requirements, and to allocate the network bandwidth to the one or more services based on the delivery requirements to produce network bandwidth allocations.

45 Claims, 21 Drawing Sheets

U.S. PATENT DOCUMENTS

| | | | |
|---|---|---|---|
| 2003/0174665 A1* | 9/2003 | Benveniste | 370/317 |
| 2003/0174690 A1* | 9/2003 | Benveniste | 370/350 |
| 2003/0181204 A1* | 9/2003 | Benveniste | 455/422.1 |
| 2005/0047429 A1* | 3/2005 | Koo et al. | 370/447 |
| 2005/0058058 A1 | 3/2005 | Cho | |
| 2005/0063330 A1* | 3/2005 | Lee et al. | 370/328 |
| 2005/0078759 A1* | 4/2005 | Zhang | 375/260 |

FOREIGN PATENT DOCUMENTS

| | | |
|---|---|---|
| WO | 2004023743 | 3/2004 |
| WO | 06099082 | 9/2006 |
| WO | 06110876 | 10/2006 |
| WO | 07090176 | 8/2007 |
| WO | 07090177 | 8/2007 |

OTHER PUBLICATIONS

International Search Report - PCT/US06/013882, International Search Authority - European Patent Office, Sep. 26, 2006.

Written Opinion - PCT/US06/013882, International Search Authority - European Patent Office, Sep. 26, 2006.

International Preliminary Report on Patentability - PCT/US06/013882, IPEA - European Patent Office, Jul. 23, 2007.

* cited by examiner

| Transmit Mode | 0 | 1 | 2 | 3 | 4 | 5 | 6 | 7 | 8 | 9 | 10 | 11 |
|---|---|---|---|---|---|---|---|---|---|---|---|---|
| Max Slot Height | 7 | 7 | 6 | 4 | 3 | 7 | 6 | 4 | 3 | 6 | 4 | 3 |

METHODS AND APPARATUS FOR ENHANCED DELIVERY OF CONTENT OVER DATA NETWORK

CLAIM OF PRIORITY UNDER 35 U.S.C. §119

The present Application for Patent claims priority to Provisional Application No. 60/669,406, filed Apr. 8, 2005, and assigned to the assignee hereof and hereby expressly incorporated by reference herein.

The present Application for Patent also claims priority to Provisional Application No. 60/720,000, filed Sep. 23, 2005, and assigned to the assignee hereof and hereby expressly incorporated by reference herein.

BACKGROUND

1. Field

The present application relates generally to the distribution of data over a data network, and more particularly, to methods and apparatus for enhanced delivery of content over a data network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner for presentation on networked devices.

In current content delivery/media distribution systems, real time and non real time services are packed into a transmission frame and delivered to devices on a network. For example, a communication network may utilize Orthogonal Frequency Division Multiplexing (OFDM) to provide communications between a network server and one or more mobile devices. This technology provides a transmission frame having data slots that are packed with services to be delivered and transmitted over a distribution network.

Unfortunately, conventional systems may pack the services into the transmission frame in a very inefficient manner. For example, the services may be packed in a way that wastes available bandwidth, or requires a receiving device to utilize significant power to receive the content. For example, a device may be required to wake up (i.e., power up its receiving logic) for long time intervals to receive the content, or may be required to wake up at frequent intervals to receive the content. In either case, such inefficient packing leads to devices utilizing more battery power, which can degrade device standby times.

Therefore, what is needed is a system to efficiently transmit content over a data network that overcomes the problems of conventional systems, and thereby allows receiving devices to receive the content in a power efficient manner.

SUMMARY

In one or more embodiments, a multiplexing system, comprising methods and apparatus, is provided that operates to efficiently multiplex one or more content flows for transmission over a data network. For example, in an aspect, the system operates to multiplex the content flows into available data slots in a transmission frame. An allocation algorithm is provided that allocates the data slots based on a variety of parameters and/or information associated with the content flows. In an aspect, the system also comprises a resize controller that operates to control how resizing is performed on one or more content flows that cannot fit into the available data slots, so that the resized flows will be able to fit into the available data slots. Thus, the system operates to efficiently multiplex one or more content flows for transmission over a data network is such a way as to meet requirements associated with the content flows, reduce transmission costs, increased bandwidth utilization, and reduce the power requirements of receiving devices.

In an aspect, a method is provided for transmitting services over a network. The method comprises receiving one or more services having associated delivery requirements, and determining that network bandwidth is available to meet the delivery requirements. The method also comprises allocating the network bandwidth to the one or more services based on the delivery requirements to produce network bandwidth allocations.

In an aspect, an apparatus is provided for transmitting services over a network. The apparatus comprises receiving logic configured to receive one or more services having associated delivery requirements. The apparatus also comprises multiplexer logic configured to determine that network bandwidth is available to meet the delivery requirements, and to allocate the network bandwidth to the one or more services based on the delivery requirements to produce network bandwidth allocations.

In an aspect, an apparatus is provided for transmitting services over a network. The apparatus comprises means for receiving one or more services having associated delivery requirements, and means for determining that network bandwidth is available to meet the delivery requirements. The apparatus also comprises means for allocating the network bandwidth to the one or more services based on the delivery requirements to produce network bandwidth allocations.

In an aspect, a computer-readable medium is provided that has a computer program comprising instructions, which when executed by at least one processor, operate to transmit services over a network. The computer program comprises instructions for receiving one or more services having associated delivery requirements, and instructions for determining that network bandwidth is available to meet the delivery requirements. The computer program also comprises instructions for allocating the network bandwidth to the one or more services based on the delivery requirements to produce network bandwidth allocations.

In an aspect, at least one processor is provided that is configured to perform a method for transmitting services over a network. The method comprises receiving one or more services having associated delivery requirements, and determining that network bandwidth is available to meet the delivery requirements. The method also comprises allocating the network bandwidth to the one or more services based on the delivery requirements to produce network bandwidth allocations.

In an aspect, a method is provided for transmitting services over a network. The method comprises receiving one or more services having associated delivery requirements, and determining that available network bandwidth is not able to meet the delivery requirements. The method also comprises resizing at least one of the one or more services to produce adjusted delivery requirements, and allocating the available network bandwidth to the one or more services based on the adjusted delivery requirements to produce network bandwidth allocations.

In an aspect, an apparatus is provided for transmitting services over a network. The apparatus comprises receiving logic configured to receive one or more services having associated delivery requirements, and a resize controller configured to resize at least one of the one or more services to produce adjusted delivery requirements. The apparatus also comprises multiplexer logic configured to determine that available network bandwidth is not able to meet the delivery requirements, and to allocate the available network bandwidth to the one or more services based on the adjusted delivery requirements to produce network bandwidth allocations.

In an aspect, an apparatus is provided for transmitting services over a network. The apparatus comprises means for receiving one or more services having associated delivery requirements, and means for determining that available network bandwidth is not able to meet the delivery requirements. The apparatus also comprises means for resizing at least one of the one or more services to produce adjusted delivery requirements, and means for allocating the available network bandwidth to the one or more services based on the adjusted delivery requirements to produce network bandwidth allocations.

In an aspect, a computer-readable medium is provided that has a computer program comprising instructions, which when executed by at least one processor, operates to transmit services over a network. The computer program comprises instructions for receiving one or more services having associated delivery requirements, and instructions for determining that available network bandwidth is not able to meet the delivery requirements. The computer program also comprises instructions for resizing at least one of the one or more services to produce adjusted delivery requirements, and instructions for allocating the available network bandwidth to the one or more services based on the adjusted delivery requirements to produce network bandwidth allocations.

In an aspect, at least one processor is provided that is configured to perform a method for transmitting services over a network. The method comprises receiving one or more services having associated delivery requirements, and determining that available network bandwidth is not able to meet the delivery requirements. The method also comprises resizing at least one of the one or more services to produce adjusted delivery requirements, and allocating the available network bandwidth to the one or more services based on the adjusted delivery requirements to produce network bandwidth allocations.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DESCRIPTION

In one or more embodiments, a multiplexing system is provided that operates to multiplex content flows into a transmission frame for transmission over a data network. For example, the multiplexed content flows comprise a particular arrangement, sequence, mixing, and/or selection of real-time and/or non real-time services for transmission to a device. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

For the purpose of this description, one or more embodiments of a multiplexing system are described herein with reference to a communication network that utilizes Orthogonal Frequency Division Multiplexing (OFDM) to provide communications between a network server and one or more mobile devices. For example, in an embodiment of an OFDM system, a superframe is defined that comprises time division multiplex (TDM) pilot signals, frequency division multiplex (FDM) pilot signals, overhead information symbols (OIS), and data symbols. A data slot is defined as a set of 500 data symbols that occur over one OFDM symbol time. Additionally, an OFDM symbol time in the superframe carries seven slots of data.

The following definitions are used herein to describe one or more embodiments of a multiplexing system.

Flow An element of a service, for example, a service may have two flows—an audio flow and a video flow.

Service A media content that can have one or more flows.

MLC A media logical channel ("channel") used for data or control information.

Resize A procedure by which services are resized to require less bandwidth for transmission.

Overhead Information Symbols (OIS)
Symbols in a superframe that carry information about the location of various MLCs in the superframe.

Slot The smallest unit of bandwidth allocated to a MLC over an OFDM symbol.

Figure 1:
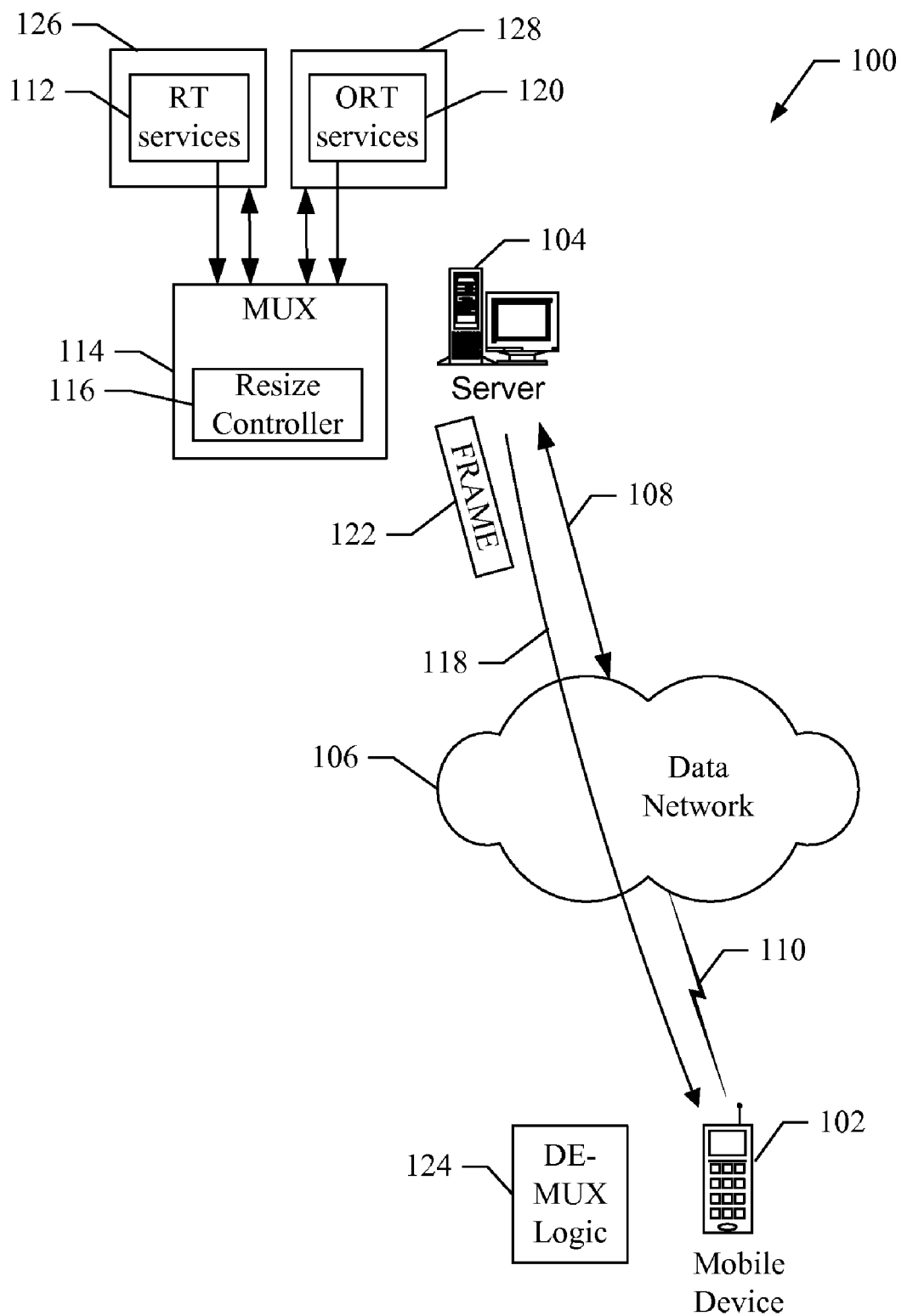
FIG. 1 shows a network that comprises an embodiment of a multiplexing system.

FIG. 1 shows a network 100 that comprises an embodiment of a multiplexing system. The network 100 comprises a mobile device 102, a server 104, and a data network 106. For the purpose of this description, it will be assumed that the data network 106 operates to communicate with one or more portable devices using OFDM technology; however, embodiments of the multiplexer system are suitable for use with other transmission technologies as well.

In an embodiment, the server 104 operates to provide services that may be subscribed to by devices in communication with the network 106. The server 104 is coupled to the network 106 through the communication link 108. The communication link 108 comprises any suitable communication link, such as a wired and/or wireless link that operates to allow the server 104 to communicate with the network 106. The network 106 comprises any combination of wired and/or wireless networks that allows services to be delivered from the server 104 to devices in communication with the network 106, such as the device 102.

It should be noted that the network 106 may communicate with any number and/or types of portable devices within the scope of the embodiments. For example, other devices suitable for use in embodiments of the multiplexer system include, but are not limited to, a personal digital assistant (PDA), email device, pager, a notebook computer, mp3 player, video player, or a desktop computer. The wireless link 110 comprises a wireless communication link based on OFDM technology; however, in other embodiments the wireless link may comprise any suitable wireless technology that operates to allow devices to communicate with the network 106.

The device 102 in this embodiment comprises a mobile telephone that communicates with the network 106 through the wireless link 110. The device 102 takes part in an activation process that allows the device 102 to subscribe to receive services over the network 106. In an embodiment, the activation process may be performed with the server 104; however, the activation process may also be performed with another server, service provider, content retailer, or other network entity. For the purpose of this description, it will be assumed that the device 102 performs the activation process with the server 104 and is now ready to subscribe and receive services from the server 104.

In an embodiment, the server 104 communicates with a real time media server (RTMS) 126 that comprises or has access to content that includes one or more real time (RT) services 112. The server 104 also communicates with a non real time media server (NRTMS) 128 that comprises or has access to one or more other than real time (ORT) services 120. For example, the services (112, 120) comprise multimedia content that includes news, sports, weather, financial information, movies, and/or applications, programs, scripts, or any other type of suitable content or service. Thus, the services (112, 120) may comprise video, audio or other information formatted in any suitable format. It should be noted that the server 104 may also communicate with one or more other media servers that comprise or have access to RT and/or ORT services. The services (112, 120) have associated delivery requirements that may include, but are not limited to, bandwidth, priority, latency, type of service, and/or any other type of delivery requirement.

The server 104 also comprises a multiplexer (MUX) 114 that operates to efficiently multiplex one or more of the services (112, 120) into a transmission frame 122 based on the delivery requirements. For example the transmission frame is transmitted over the network 106 to the device 102, as shown by the path 118. A more detailed description of the MUX 114 is provided in another section of this document. As a result of the operation of the MUX 114, the services (112, 120) are optimally packed into the transmission frame 122 so that the delivery requirements (bandwidth, priority, latency, type of service, etc.) of the services (112, 120) are met, transmission bandwidth of the transmission frame 122 is efficiently utilized, and power at receiving device 102 is conserved. For example, by efficiently utilizing the available bandwidth, a mobile device can receive transmitted services over a short time interval, thereby conserving battery power.

In an embodiment, the MUX 114 comprises a resize controller 116 that operates to control how the RT services 112 and/or the ORT services 120 are resized. For example, if selected RT services 112 to be multiplexed into the transmission frame 122 will not fit into the available bandwidth of the transmission frame 122, the resize controller 116 operates to control how those services are resized (or re-encoded) so as to reduce their bandwidth requirements. For example, the resize controller 116 communicates with the RTMS 126 to request selected resizing of a particular RT services. The resize controller 116 also operates in a similar fashion to communicate with the NRTMS 128 to control how selected ORT services 120 are resized. As a result of the operation of the resize controller 116, resized RT and ORT services will fit within the available bandwidth of the transmission frame 122. A more detailed description of the resize controller 116 is provided in another section of this document.

In an embodiment, the device 102 comprises de-multiplexer (DE-MUX) logic 124 that operates to de-multiplex the transmission frame 122 to obtain the transmitted services (112, 120). Because the services have been efficiently multiplexed into the transmission frame 122, network bandwidth is conserved and the device 102 utilizes less power to receive the transmitted services.

Therefore, embodiments of the multiplexing system operates to perform one or more of the following functions to provide efficient multiplexing of RT and ORT services into a transmission frame.

1. Receive or gain access to one or more RT and/or ORT services for transmission over a network.

2. Determine if the RT and/or ORT services will fit into the available bandwidth of a transmission frame.
3. If the RT and/or ORT services will not fit into the transmission frame, resize one or more selected RT and/or ORT services to reduce their bandwidth requirements.
4. Utilize embodiments of an allocation algorithm to assemble the transmission frame with original and/or resized RT services, and original and/or resized ORT services so that the frame is efficiently packed.
5. Transmit the transmission frame over a network to one or more receiving devices.

Therefore, in one or more embodiments, a multiplexing system operates to efficiently multiplex and transmit one or more RT and/or ORT services to devices on a data network. It should be noted that the multiplexing system is not limited to the implementations described with reference to FIG. 1, and that other implementations are possible within the scope of the embodiments.

Figure 2:
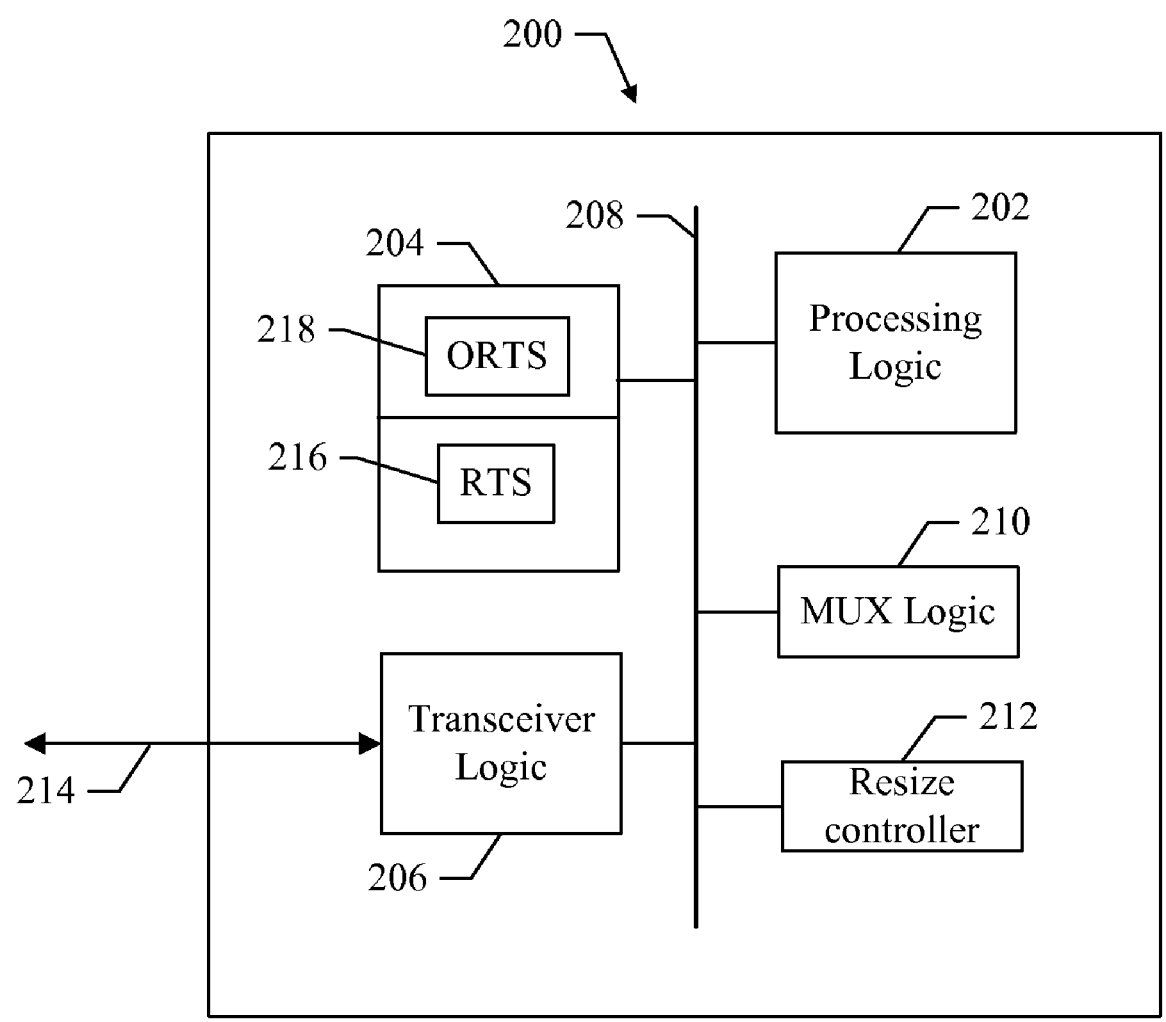
FIG. 2 shows an embodiment of a server for use in a multiplexer system.

FIG. 2 shows an embodiment of a server 200 for use in a multiplexing system. For example, the server 200 may be used as the server 104 in FIG. 1. The server 200 comprises processing logic 202, memory 204, and transceiver logic 206, all coupled to a data bus 208. The server 200 also comprises multiplexer (MUX) logic 210 and resize controller 212, which are also coupled to the data bus 208. It should be noted that the server 200 represents just one implementation and that other implementations are possible within the scope of the embodiments.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions and to control one or more other functional elements of the server 200 via the data bus 208.

The transceiver logic 206 comprises hardware and/or software that operate to allow the server 200 to transmit and receive data and/or other information with remote devices or systems through the communication channel 214. For example, in an embodiment, the communication channel 214 comprises any suitable type of communication link to allow the server 200 to communicate directly with other servers or with one or more data networks and/or devices coupled to those data networks.

The memory 204 comprises any suitable type of storage device or element that allows the server 200 to store information parameters. For example, in an embodiment the memory 204 comprises any type of RAM, Flash memory, hard disk, or any other type of storage device.

In an embodiment, the processing logic 202 operates to communicate with one or more content providers through the transceiver logic 208 and channel 214. For example, the processing logic 202 communicates with a RTMS to receive RT services 216 and a NRTMS to receive ORT services 218. For example, the RT services 216 and the ORT services 218 comprises one or more content flows that are to be delivered to devices on a network. Furthermore, the RT 216 and ORT 218 services have associated delivery requirements that include, but are not limited to, bandwidth, priority, latency, type of service, and/or any other type of delivery requirement.

In one or more embodiments, the MUX logic 210 comprises a CPU, processor, gate array, hardware logic, memory elements, virtual machine, software, and/or any combination of hardware and software. The MUX logic 210 operates to multiplex one or more of the RT services 216 and/or ORT services 218 into a transmission frame based on the delivery requirements for transmission to devices using the transceiver logic 206 and the channel 214. For example, the MUX logic 210 operates to determine if selected ORT services 218, RT services 216, and Best Effort services (not shown) will fit into the available bandwidth of the transmission frame (with respect to their delivery requirements). For example, the Best Effort services comprise any type of data or information that needs to be transmitted. If the above flows will fit into the available bandwidth, the MUX logic 210 operates to pack them into the transmission frame according to one or more embodiments of algorithm described herein.

If selected RT services 216 and/or ORT services 218 will not fit into the transmission frame, the MUX logic 210 signals the resize controller 212. The resize controller 212 operates to control how those services are resized to fit into the available bandwidth of the transmission frame. In an embodiment, the resize controller 212 operates to determine how much "resizing" a particular service needs to reduce its transmission bandwidth requirements and then assembles a resize request that is transmitted to the media server associated with that service. For example, the resize request is transmitted by the transceiver logic 206 using the communication link 214. The media server then operates to resize the service as requested. After the services have been resized to reduce their bandwidth requirements the MUX logic 210 is able to efficiently pack the original services and any resized services into the transmission frame. A more detailed description of allocation algorithms provided by the MUX logic 210 is provided in another section of this document.

In one or more embodiments, the resize controller 212 comprises a CPU, processor, gate array, hardware logic, memory elements, virtual machine, software, and/or any combination of hardware and software. The resize controller 212 operates to control how one or more of the flows of the RT service 216 and the ORT services 218 are resized so that those flows will fit into the available bandwidth of a transmission frame. Thus, the resize controller 212 operates to resize one or more services so as to adjust its associated delivery requirements. For example, a service may be resized so that its bandwidth requirements are adjusted (i.e., reduced). In an embodiment, the resize controller 212 is part of the MUX logic 210. A more detailed description of the resize controller 212 is provided in another section of this document.

In an embodiment, the multiplexing system comprises a computer program having one or more program instructions ("instructions") stored on a computer-readable medium, which when executed by at least one processor, for instance, the processing logic 202, provides the functions of the multiplexing system described herein. For example, instructions may be loaded into the server 200 from a computer-readable media, such as a floppy disk, CDROM, memory card, FLASH memory device, RAM, ROM, or any other type of memory device or computer-readable medium that interfaces to the server 200. In another embodiment, the instructions may be downloaded into the server 200 from an external device or network resource that interfaces to the server 200 through the transceiver logic 206. The instructions, when executed by the processing logic 202, provide one or more embodiments of a multiplexing system as described herein.

Thus, the server 200 operates to provide embodiments of a multiplexing system to efficiently multiplex flows associated with the RT services 216 and the ORT services 218 into a transmission frame for transmission to devices on a network.

Transmission Frame Slot Allocation Algorithm

The following description describes a slot allocation algorithm for use in embodiments of a multiplexing system. In an embodiment, the slot allocation algorithm operates to allocate slots in a transmission frame to content flows associated with available RT and ORT services. The allocation algorithm operates to achieve efficient bandwidth utilization and thereby allows a receiving device to conserve power. In one or more embodiments, the allocation algorithm is performed by and/or under the control of the MUX logic 210.

For the purpose of this description, the transmission frame will be referred to hereinafter as a superframe. It should be noted that the superframe is just one implementation and that embodiments of the multiplexing system are suitable for use with other types of transmission frame implementations.

In an embodiment, a superframe comprises a data symbol portion that is utilized for bandwidth allocation. The data symbol portion of a superframe is divided into four equal portions, which are referred to hereinafter as "frames." Data from services to be transmitted, which in an embodiment are in Reed Solomon (RS) blocks, are distributed equally over the four frames. Therefore, the operation of the slot allocation algorithm over a superframe is a repetition of the operation of the slot allocation algorithm over a frame. Thus, the following description describes slot allocation over a frame, but is equally applicable to an entire superframe. Additionally, the slot allocation algorithm discussed may be used to allocate slots for all types of services, including but not limited to, real time services, non real time services, and IP data cast.

Channel Allocations

In one or more embodiments, a MLC carries one or more flows of the same service. Thus, every service can have one or more MLC's, with their location in the frame described in the OIS. A device that desires to receive a particular MLC gets the location of that MLC from the OIS. The location of an MLC in a frame is described in the OIS using the following.

Start Symbol
Start Slot
Lowest Slot
Highest Slot
Total Slots

Figure 3:
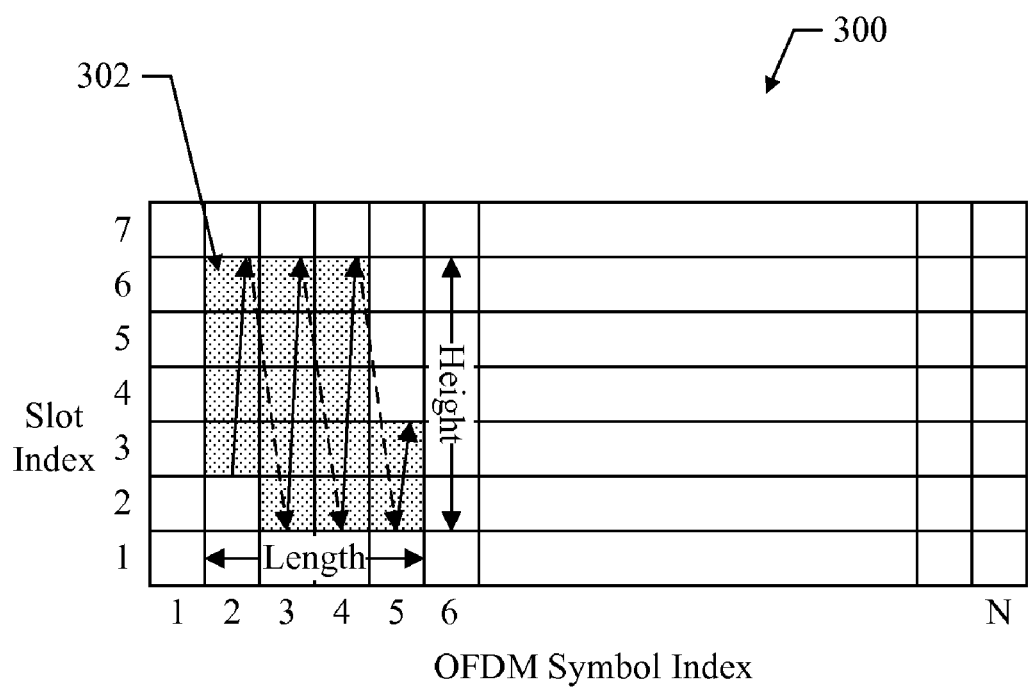
FIG. 3 shows an embodiment of a frame that illustrates a MLC's slot allocation for use in a multiplexing system.

FIG. 3 shows an embodiment of a frame 300 that illustrates a MLC's slot allocation for use in a multiplexing system. The frame 300 comprises "N" OFDM symbols for each of seven (7) slots. The MLC's slot allocation is the shaded region shown generally at 302. Two variables are used to describe the slot allocation, namely; length and height. The length is in OFDM symbols and the height is in slots.

Allocation Shapes

Figure 4:
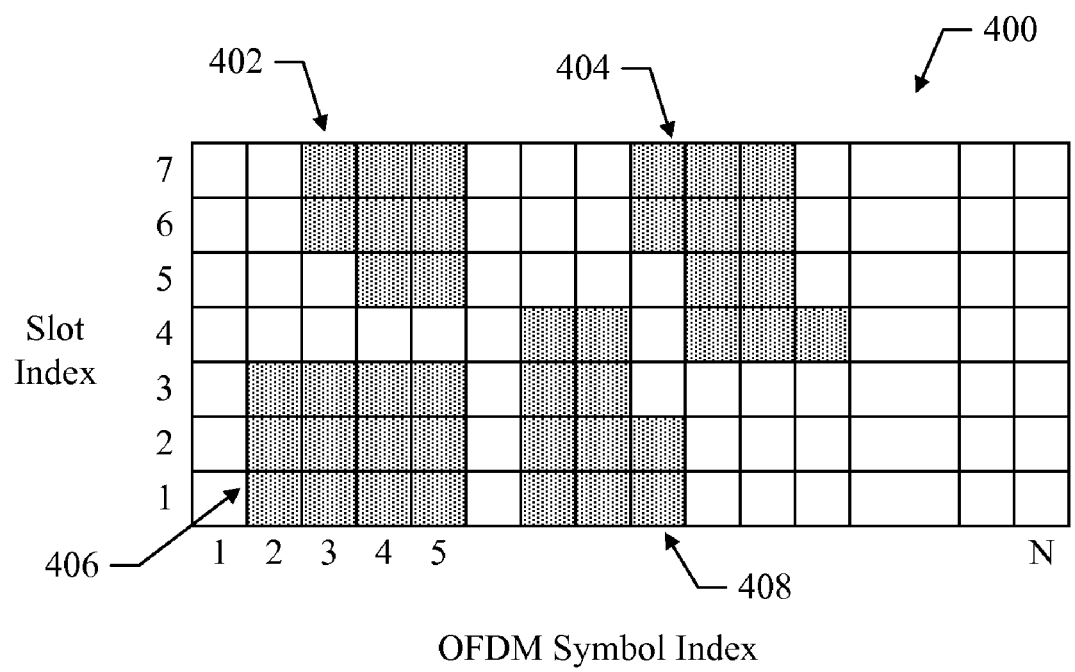
FIG. 4 shows an embodiment of a frame that comprises various MLC allocation shapes for use in a multiplexing system.

FIG. 4 shows an embodiment of a frame 400 that comprises various MLC allocation shapes for use in a multiplexing system. For example, the MLC allocations are the shaded regions shown generally at 402, 404, 406, and 408. In an embodiment, the allocation shapes are selected so that they may be described in the OIS of the frame 400 using a fixed limited number of data fields.

Height of an Allocation

Figures 5, 6:
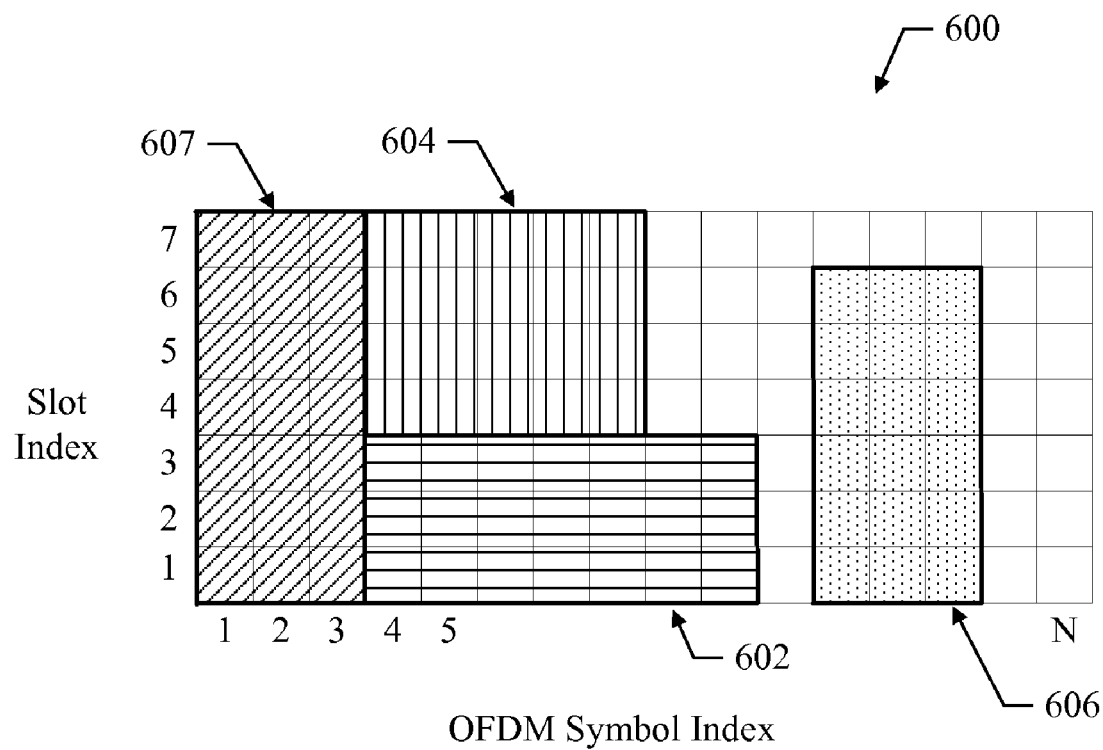
FIG. 5 shows a table that illustrates a relationship between a transmit mode parameter and a maximum slot height value for a selected MLC allocation.
FIG. 6 shows an embodiment of a frame that illustrates different MLC slot allocations for use in a multiplexing system.

FIG. 5 shows a table 500 that illustrates a relationship between a transmit mode parameter and a maximum slot height value for a selected MLC allocation. The peak output rate of a turbo decoder at a receiving device limits the number of turbo packets that can be decoded in a single OFDM symbol. As a result, the height of the MLC allocation may be constrained. A variable referred to as the maximum slot height ("maxSlotHeight") is used to denote the maximum slot height of an MLC allocation for a given transmit mode. For example, from the table 500 it can be seen that a transmit mode of four (4) supports an MLC allocation having a max-SlotHeight of three (3), and a transmit mode of one (1) supports an MLC allocation having a maxSlotHeight of seven (7).

Allocation Algorithm

In an embodiment, all MLC's of a selected service are grouped together so that their allocations are temporally adjacent in the frame. This reduces the number of times a receiving device needs to "wake up" to receive different MLC's of a service. Thus, the power consumption of a receiving device is reduced or conserved.

With respect to a receiving device's power consumption, it is preferable that the height of an MLC allocation be its maxSlotHeight. This minimizes possible "on time" for the device to receive that MLC. However, for ease of packing, all the grouped MLC's of a service are allocated with the same height. Thus, the concept of "maxSlotHeight of a service" is defined as the minimum or smallest of the maxSlotHeight parameters of all the MLC's grouped for that service. For the remainder of this description, a service's height will mean the common height of all the MLC allocations of that service.

FIG. 6 shows an embodiment of a frame 600 that illustrates different MLC slot allocations for use in a multiplexing system. The frame 600 is divided into MLC allocations having blocks of different heights. In an embodiment, the block heights correspond to the possible maxSlotHeights a service can take. From the table 500 shown in FIG. 5, it can be determined that there are four possible maxSlotHeights (i.e., 3, 4, 6, or 7). In an embodiment, the slot allocation algorithm operates to pack services into different block allocations based on the maxSlotHeight parameter. For example, allocations based on the possible maxSlotHeights (i.e., 3, 4, 6, or 7) are shown at 602, 604, 606, and 607, respectively.

Allocation Algorithm Operation

The following is a description of embodiments of an allocation algorithm for use in a multiplexing system. In an embodiment, the MUX logic 210 operates to implement the allocation algorithm to perform the functions described below.

The inputs to the allocation algorithm are as follows.
1. Number of slots of data that each channel of a service has for a frame.
2. The maxSlotHeight of each channel of a service, which is determined by the transmit mode of that channel.

The outputs of the algorithm are as follows.
1. A decision indicating whether packing is possible. If packing is possible, the algorithm gives the locations of MLC allocations.
2. If packing is not possible the slot allocation algorithm asks for a resizing of services from the resize controller 212. In an embodiment, the resize controller 212 decides on which services to resize and at what rates. A description of the operation of the resize controller 212 is provided in another section of this document.

Figure 7:
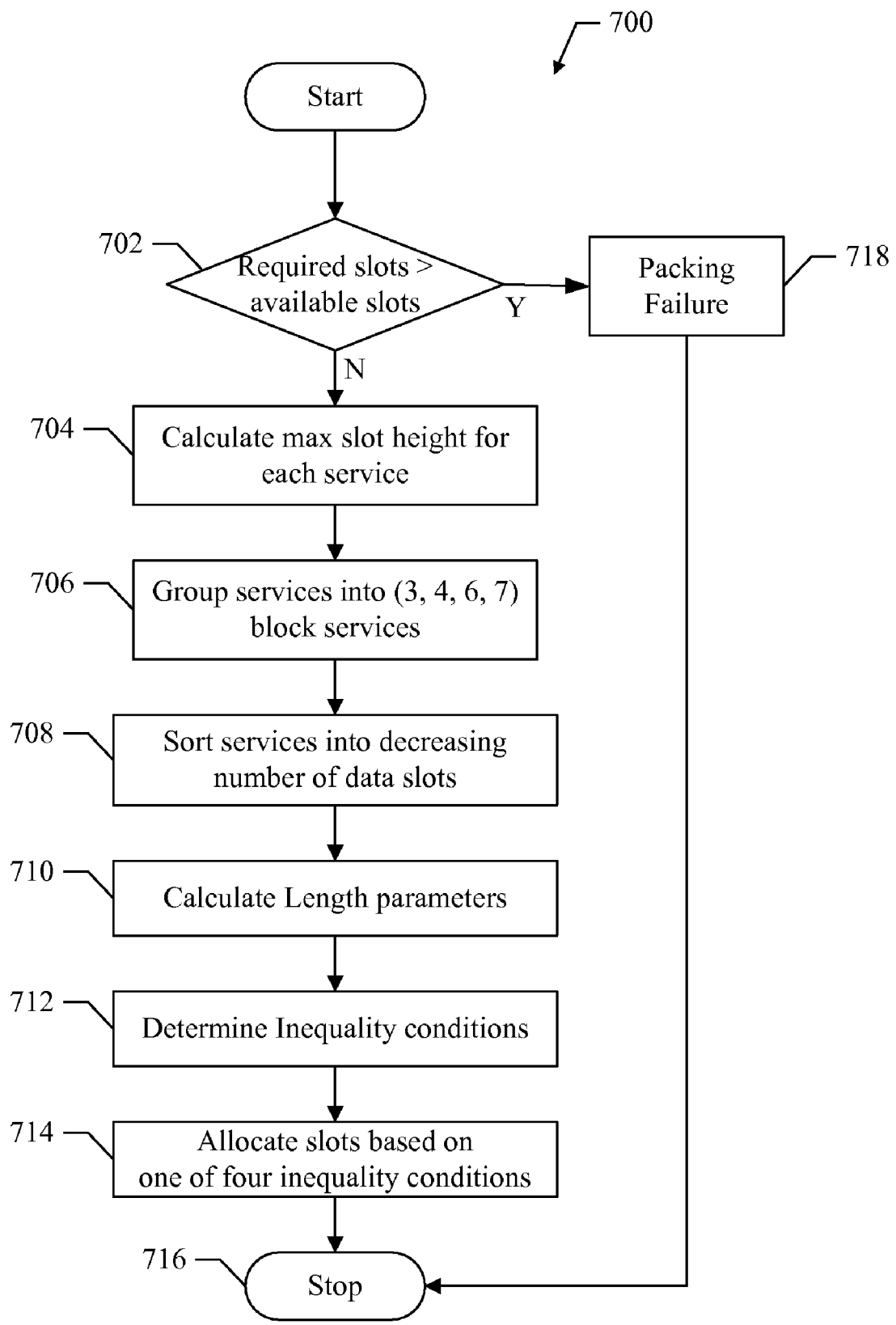
FIG. 7 shows a method for providing an embodiment of an allocation algorithm use in a multiplexing system.

FIG. 7 shows an embodiment of a method 700 for providing an allocation algorithm use in a multiplexing system. For example, the method 700 operates to allocate slots to one or more RT services. In an embodiment, the MUX logic 210 operates to provide the functions of the method 700 as describe below.

At block 702, a test is performed to determine if the total number of slots required by all the RT services to be multiplexed in a frame is greater than the number of available slots. For example, the MUX logic 210 makes this determination. In an embodiment, the number of available slots has a value of seven times the "number of symbols per frame" (numOfdm-SymbolsPerFrm). If the required number of slots is greater than the available slots, the method proceeds to block 718. If the required number of slots is less than or equal to the number of available slots, the method proceeds to block 704.

At block 718, a packing failure is determined. For example, in an embodiment, the MUX logic 210 determines that there are not enough available slots to pack the services and the method then ends at block 716.

At block 704, a maxSlotHeight parameter for each RT service is calculated. For example, in an embodiment, the MUX logic 210 operates to perform this calculation. The maxSlotHeight indicates the maximum number of slots per symbol permissible for each RT service.

At block 706, the RT services to be multiplexed are grouped into "three block services" (threeBlkSrvcs), "four block services" (fourBlkSrvcs), "six block services" (sixBlk-Srvcs), and "seven block services" (sevenBlkSrvcs) based on their maxSlotHeight parameters. In an embodiment, the MUX logic 210 operates to group the services by their slot requirements.

At block 708, the RT services in each group are sorted by decreasing number of data slots. For example, the RT services are sorted from largest to smallest with respect to the data slots required.

At block 710, the length variables L7, L6, L4 and L3 are calculated. For example, the length of sevenBlkSrvcs is "L7", the length of sixBlkSrvcs is "L6", the length of fourBlkSrvcs is "L4", and the length of threeBlkSrvcs is "L3." For example, the length of all sevenBlkSrvcs is defined as;

$$L7 = \text{ceil (total data slots of all sevenBlkSrvcs/7)}$$

where ceil(x) is the smallest integer greater than x. In an embodiment, the MUX logic 210 operates to compute the length parameters (L7, L6, L4 and L3).

At block 712, one or more inequality checks are performed. For example, the following inequalities are checked to determine whether each is true or false.

$$L7+L3+L6 <= \text{numOfdmSymbolsPerFrm} \quad (1)$$

$$L7+L4+L6 <= \text{numOfdmSymbolsPerFrm} \quad (2)$$

As a result of the above inequality equations, four inequality conditions are determined. The first inequality (1) has true and false results that are hereinafter referred to as (1T, 1F). The second inequality (2) has true and false results that are hereinafter referred to as (2T, 2F). Thus, the above two inequalities provide four inequality conditions (i.e., 1T2T, 1T2F, 1F2T, 1F2F) that are used to allocate slots according to one or more embodiments of a multiplexing system.

At block 714, slots are allocated to the RT services based on one of four inequality conditions. For example, the results of the inequality checks performed at block 712 are used to allocate slots to the RT services. Each of the four conditions determines allocations as described in allocation methods discussed in the following sections of this document.

It should be noted that the method 700 represents just one implementation and the changes, additions, deletions, combinations or other modifications of the method 700 are possible within the scope of the embodiments.

Figure 8:
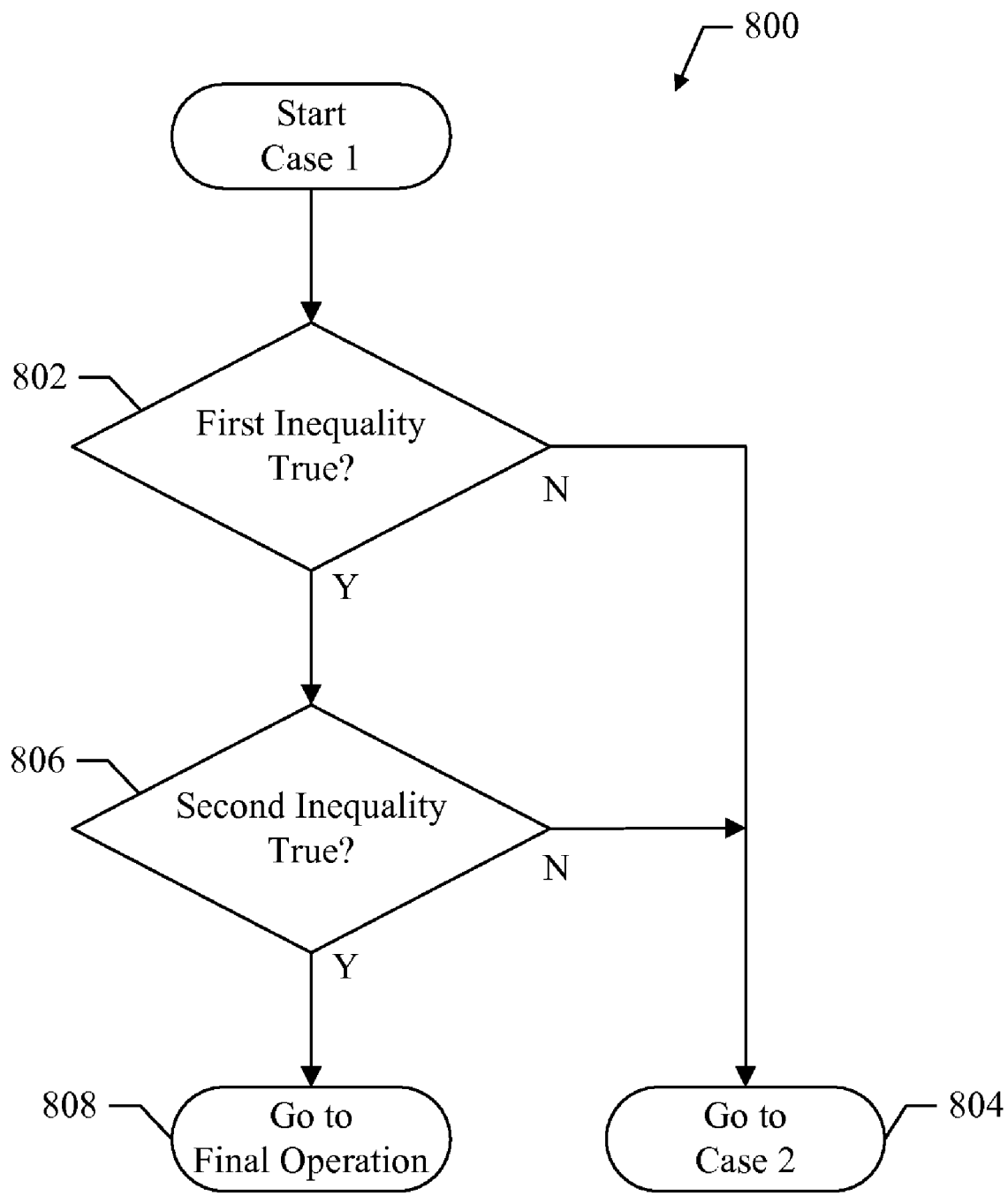
FIG. 8 shows an embodiment of a method for allocating slots to RT services based on a first inequality condition for use in a multiplexing system.

FIG. 8 shows an embodiment of a method 800 for allocating slots to RT services based on a first inequality condition for use in a multiplexing system. For example, the method 800 provides slot allocations associated with a first inequality condition described by (1T2T). In an embodiment, the MUX logic 210 operates to provide the functions of the method 800 as describe below.

At block 802, a test is performed to determine if the state of the first inequality is true (i.e., 1T). If the state of the first inequality (1) is not 1T, the method proceeds to block 804. If the state of the first inequality (1) is 1T, the method proceeds to block 806.

At block 804, the method proceeds to test the second inequality condition. For example, because the state of the first inequality (1) is not 1T, the method proceeds to the method 900 to test the second inequality condition (1T2F).

At block 806, a test is performed to determine if the state of the second inequality (2) is true (i.e., 2T). If the state of the second inequality (2) is not 2T, the method proceeds to block 804. If the state of the second inequality (2) is 2T, the method proceeds to block 808.

At block 808, the method proceeds to the final operation. Because both states (1T2T) exist, the method proceeds to a final operation (described below) to complete the slot allocation.

It should be noted that the method 800 represents just one implementation and the changes, additions, deletions, combinations or other modifications of the method 800 are possible within the scope of the embodiments.

Figure 9:
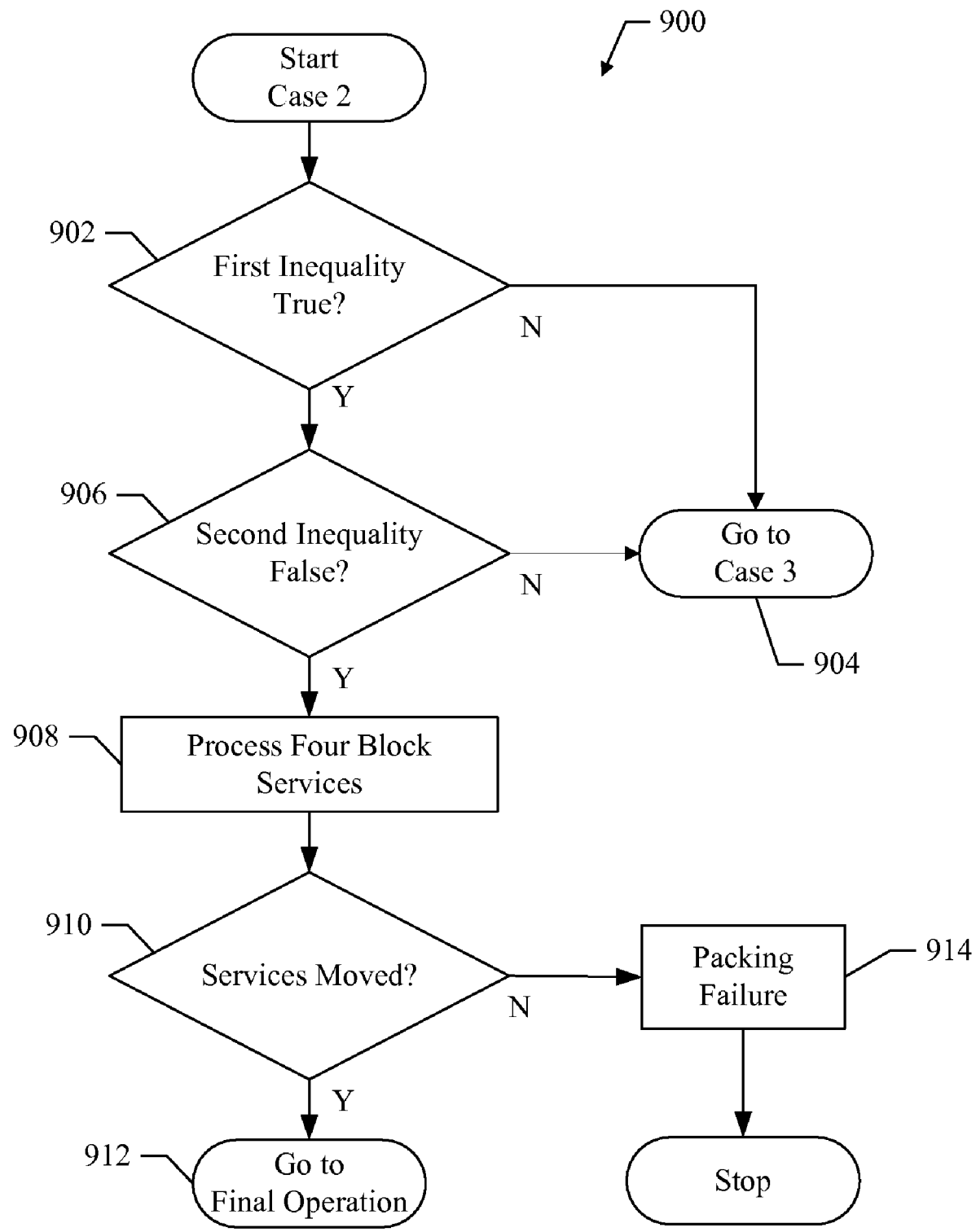
FIG. 9 shows an embodiment of a method for allocating slots to RT services based on a second inequality condition for use in a multiplexing system.

FIG. 9 shows an embodiment of a method 900 for allocating slots to RT services based on a second inequality condition for use in a multiplexing system. For example, the method 900 provides slot allocations associated with a second inequality condition described by (1T2F). In an embodiment, the MUX logic 210 operates to provide the functions of the method 900 as describe below.

At block 902, a test is performed to determine if the state of the first inequality (1) is true (i.e., 1T). If the state of the first inequality (1) is not 1T, the method proceeds to block 904. If the state of the first inequality (1) is 1T, the method proceeds to block 906.

At block 904, the method proceeds to test the third inequality condition. For example, because the state of the first inequality (1) is not 1T, the method proceeds to the method 1100 to test the third inequality condition (1F2T). At block 906, a test is performed to determine if the state of the second inequality (2) is false (i.e., 2F). If the state of the second inequality (2) is not 2F, the method proceeds to block 904. If the state of the second inequality (2) is 2F, the method proceeds to block 908 where four block services are processed.

Figure 10:
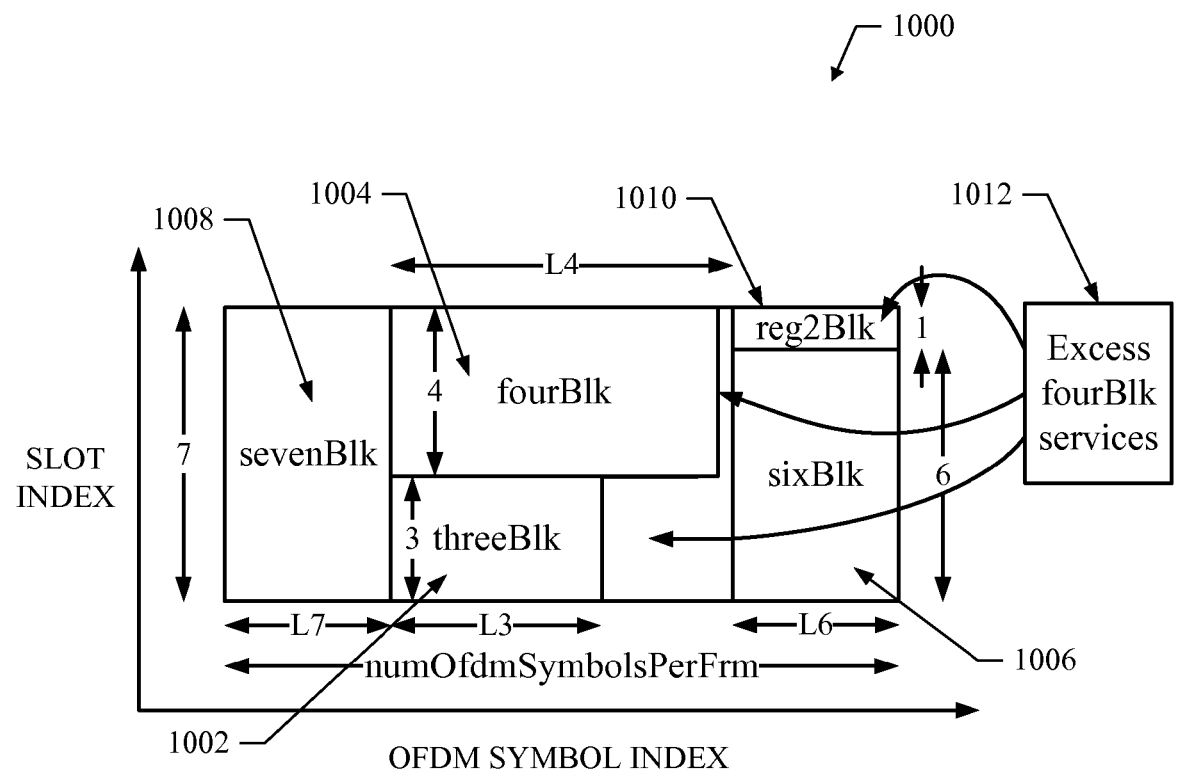
FIG. 10 shows a frame that illustrates the operation of an embodiment of a multiplexing system to allocate excess four block services.

FIG. 10 shows a frame 1000 that illustrates the operation of an embodiment of a multiplexing system to allocate excess four block services. For example, the allocation blocks comprise threeBlk 1002, fourBlk 1004, sixBlk 1006, and sevenBlk 1008. The allocation blocks also include reg2Blk 1010. The frame 1000 illustrates how the method 900 operates to allocate excess four block services (fourBlkSrvc) 1012 to the fourblk 1004, threeblck 1002 and reg2blk 1010 allocation blocks. In an embodiment, the method 900 operates to allocate RT services to the frame 1000 shown in FIG. 10.

Referring again to FIG. 9, at block 908, four block services are processed. For example, in an embodiment, the MUX logic 210 operates to process four block services as described below with reference to the frame 1000 shown in FIG. 10.

a. Find the fourBlkSrvc up to which fourBlk 1004 can hold to satisfy the first inequalities condition described with reference to the method 800 above. Then update fourBlk 1004 without excess fourBlkSrvcs.

b. Move excess fourBlkSrvcs to threeBlk 1002 and reg2Blk 1010. Reg2Blk 1010 is a block of height 1 as shown in FIG. 10.

c. While moving excess fourBlkSrvcs also check whether successive services can fit in fourBlk 1004 itself.

d. Complete the move only if the following conditional inequalities are true.

$((L7+L3+L6)<=numOfdmSymbolsPerFrm)$ &&

$((L7+L4+L6)<=numOfdmSymbolsPerFrm)$ &&

$((L7+L4+Lreg2)<=numOfdmSymbolsPerFrm)$

At block 910, a test is performed to determine if excess four block services can be moved as described above. If excess fourBlkSrvcs cannot be moved to either threeBlk 1002 or reg2Blk 1010 to satisfy the conditional inequalities at block 908, then the method proceeds to block 914 where a packing failure is determined and the method stops. If excess fourBlkSrvcs can be moved, then the method proceeds to block 912.

At block 912, the method proceeds to the final operation. Because the excess fourBlkSrvcs were able to be successfully moved, the method proceeds to a final operation to complete the slot allocation.

It should be noted that the method 900 represents just one implementation and the changes, additions, deletions, combinations or other modifications of the method 900 are possible within the scope of the embodiments.

Figure 11:
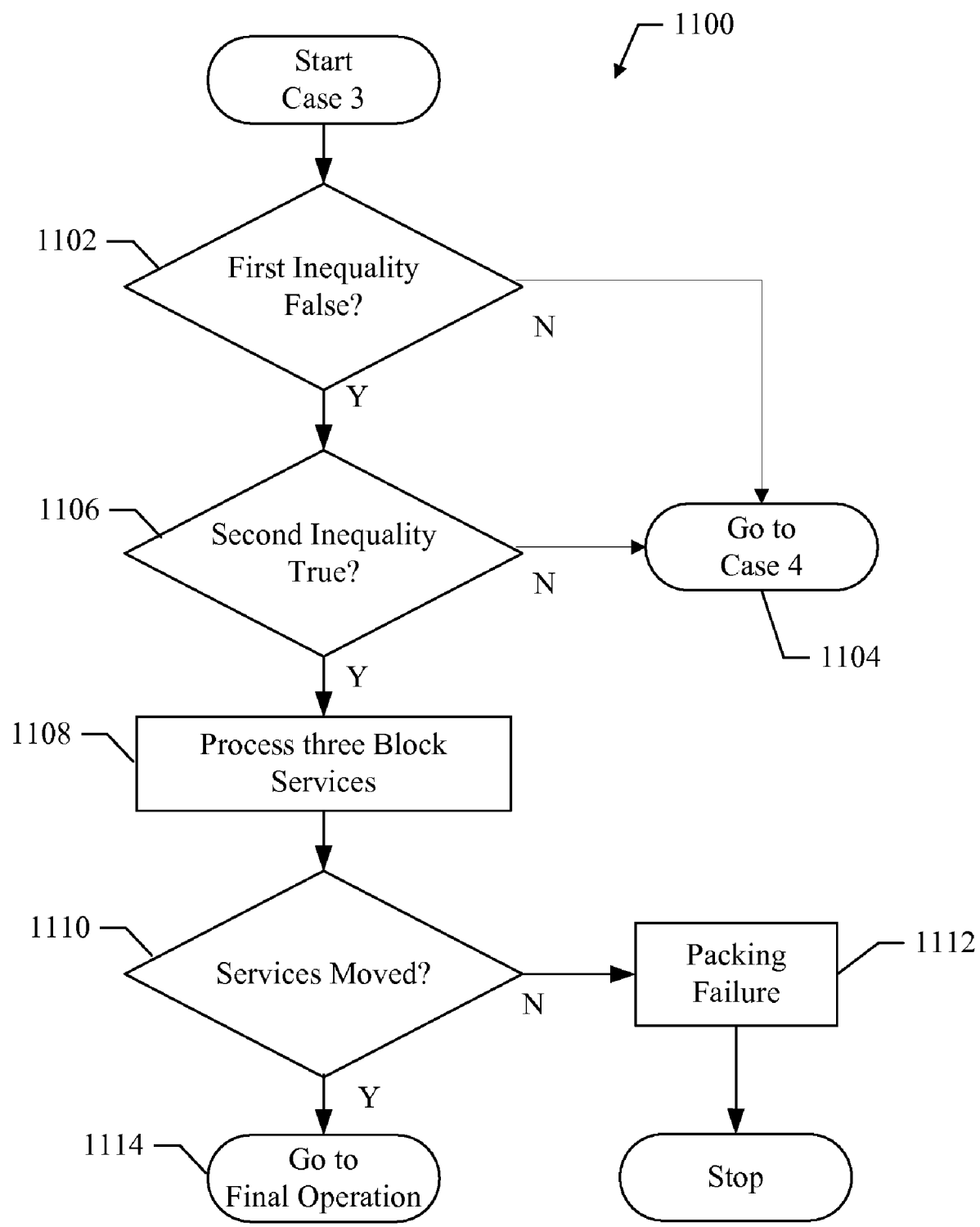
FIG. 11 shows an embodiment of a method for allocating slots to RT services based on a third inequality condition for use in a multiplexing system.

FIG. 11 shows an embodiment of a method 1100 for allocating slots to RT services based on a third inequality condition for use in a multiplexing system. For example, the method 1100 provides allocations when a third inequality condition (1F2T) exists. In an embodiment, the MUX logic 210 operates to provide the functions of the method 1100 as describe below.

At block 1102, a test is performed to determine if the state of the first inequality (1) is false (i.e., 1F). If the state of the first inequality (1) is not 1F, the method proceeds to block 1104. If the state of the first inequality (1) is 1F, the method proceeds to block 1106.

At block 1104, the method proceeds to process the fourth inequality condition. For example, because the state of the first inequality (1) is not 1F, the method proceeds to the method 1300 to process the fourth inequality condition (1F2F) which now must exist because it is the only condition remaining.

At block 1106, a test is performed to determine if the state of the second inequality (2) is true (i.e., 2T). If the state of the second inequality (2) is not 2T, the method proceeds to block 1104. If the state of the second inequality (2) is 2T, the method proceeds to block 1108.

Figure 12:
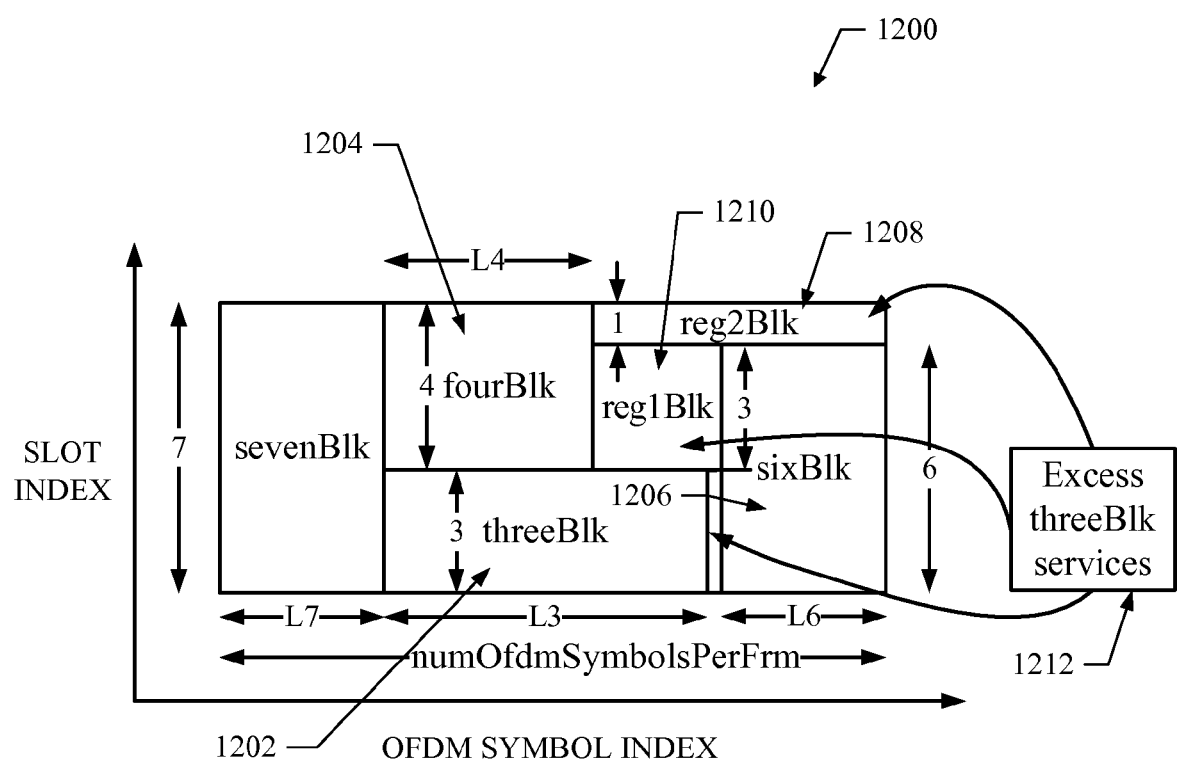
FIG. 12 shows a frame that illustrates the operation of an embodiment of a multiplexing system to allocate excess three block services.

FIG. 12 shows a frame 1200 that illustrates the operation of an embodiment of a multiplexing system to allocate excess three block services. For example, the allocation blocks comprise threeBlk 1202, fourBlk 1204, sixBlk 1206, reg2Blk 1208, and reg1Blk 1210. The frame 1200 illustrates how the method 1100 operates to allocate excess three block services (threeBlkSrvcs) 1212 to the threeBlk 1202, reg1Blk 1210 and reg2Blk 1208 allocation blocks.

Referring again to FIG. 11, at block 1108, three block services (threeblkSrvcs) are processed. For example, in an embodiment, the MUX logic 210 operates to process threeblkSrvcs as follows.

a. Find the threeBlkSrvc up to which threeBlk 1202 can hold to satisfy the first inequalities condition described with reference to the method 800 above. Then update threeBlk 1202 without excess threeBlkSrvcs.

b. Move excess threeBlkSrvcs to reg1Blk 1210 and reg2Blk 1208. Reg1Blk 1210 is a block of height 3 as shown in FIG. 12.

c. While moving also check whether successive services can fit into threeBlk 1202 itself.

d. Complete the move only if the following conditional inequalities are true.

$((L7+L3+L6)<=numOfdmSymbolsPerFrm)$ &&

$((L7+L4+Lreg1+L6)<=numOfdmSymbolsPerFrm)$ &&

$((L7+L4+Lreg2)<=numOfdmSymbolsPerFrm)$

At block 1110, a test is performed to determine if excess three block services can be moved. If excess threeBlkSrvcs cannot be moved to either reg1Blk 1210 or reg2Blk 1208 to satisfy the conditional inequalities at block 1108, then the method proceeds to block 1112 where a packing failure is determined and the method stops. If excess three block services can be moved, then the method proceeds to block 1114.

At block 1114, the method proceeds to the final operation. Because the excess threeBlkSrvcs were able to be successfully moved, the method proceeds to a final operation to complete the slot allocation.

It should be noted that the method 1100 represents just one implementation and the changes, additions, deletions, combinations or other modifications of the method 1100 are possible within the scope of the embodiments.

Figure 13:
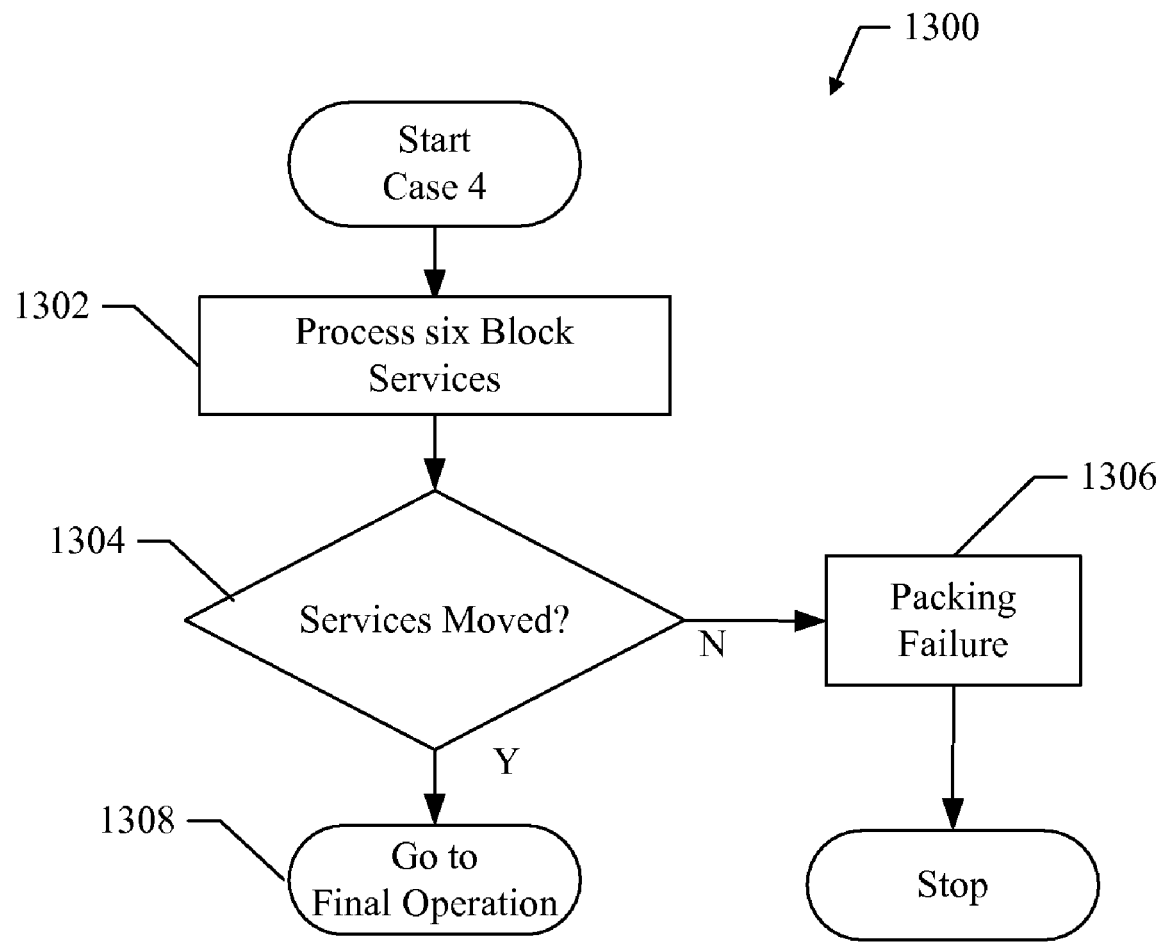
FIG. 13 shows an embodiment of a method for allocating slots to RT services based on a fourth inequality condition for use in a multiplexing system.

FIG. 13 shows an embodiment of a method 1300 for allocating slots to RT services based on a fourth inequality condition for use in a multiplexing system. The method 1300 provides allocations when the first, second and third inequality conditions do not exist. In this case, the state of the inequality equations can be described as (1F2F). In an embodiment, the MUX logic 210 operates to provide the functions of the method 1300 as describe below.

Figure 14:
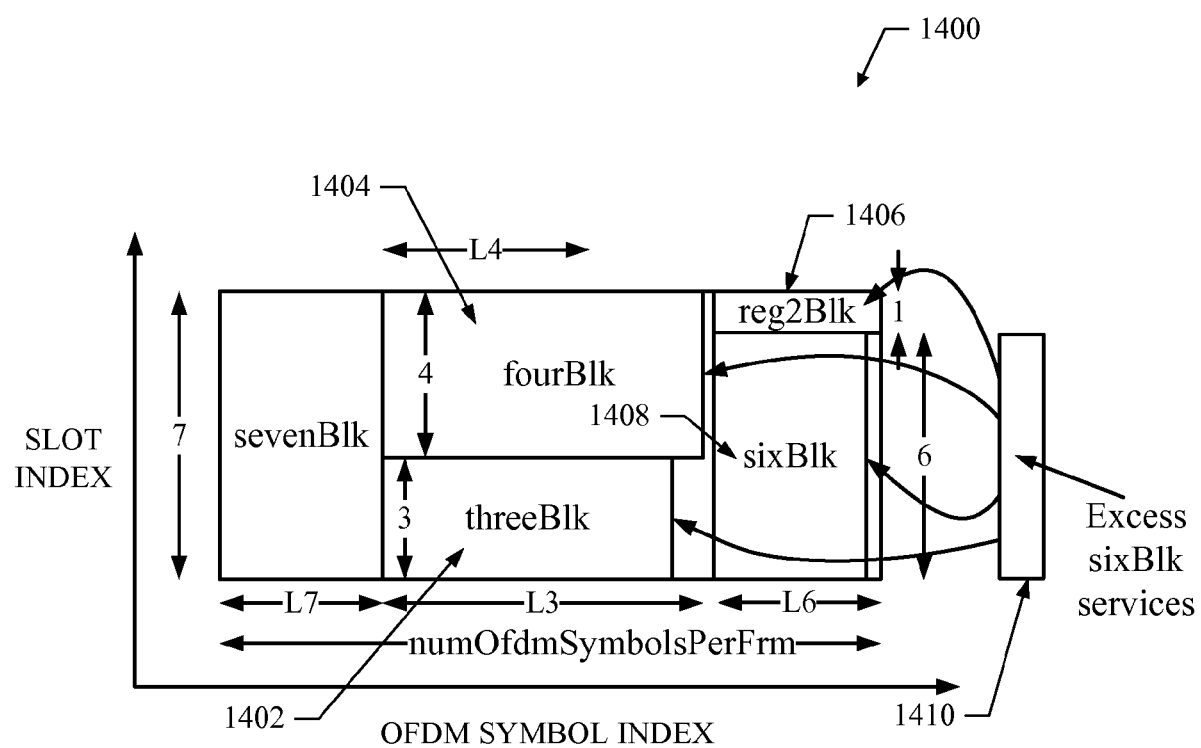
FIG. 14 shows a frame that illustrates the operation of an embodiment of a multiplexing system to allocate excess six block services.

FIG. 14 shows a frame 1400 that illustrates the operation of an embodiment of a multiplexing system to allocate excess six block services. For example, the frame 1400 comprises threeBlk 1402, fourBlk 1404, reg2Blk 1406, and sixBlk 1408 allocation blocks. The frame 1400 illustrates how excess six block services (sixBlkSrvcs) 1410 are allocated.

Referring again to FIG. 13, at block 1302, six block services are processed. For example, in an embodiment, the MUX logic 210 operates to process six block services as follows.

a. Find the sixBlkSrvc up to which fourBlk 1404 and sixBlk 1408 can hold to satisfy the first inequalities condition described with reference to the method 800 above. Then update sixBlk 1408 without excess services.

b. Move excess sixBlkSrvcs to threeBlk 1402, fourblk 1404, and reg2Blk 1406.

c. While moving also check whether successive services can fit in sixBlk 1408 itself.

d. Complete the move only if the following conditional inequalities are true.

$((L7+L3+L6)<=numOfdmSymbolsPerFrm)$ &&

$((L7+L4+L6)<=numOfdmSymbolsPerFrm)$ &&

$((L7+L4+Lreg2)<=numOfdmSymbolsPerFrm)$

At block 1304, a test is performed to determine if excess six block services can be moved. If excess six block services cannot be moved to fourblk 1404, threeblk 1402, or reg2Blk 1406 to satisfy the conditional inequalities at block 1302, then the method proceeds to block 1306 where a packing failure is determined and the method stops. If excess six block services can be moved, then the method proceeds to block 1308.

At block 1308, the method proceeds to the final operation. Because the excess sixBlkSrvcs were able to be successfully moved, the method proceeds to a final operation to complete the slot allocation.

It should be noted that the method 1300 represents just one implementation and the changes, additions, deletions, combinations or other modifications of the method 1300 are possible within the scope of the embodiments.

Final Operation

Thus, from the operations performed above, information is obtained regarding to which block each RT service is allocated. Additionally, the number of slots of data each channel of a RT service has for a frame is now known. This information is sufficient to arrive at the location of every channel allocation. In an embodiment, the slots may be allocated contiguously to the channels within a block, respecting its max height constraint.

Packing Example

Figure 15:
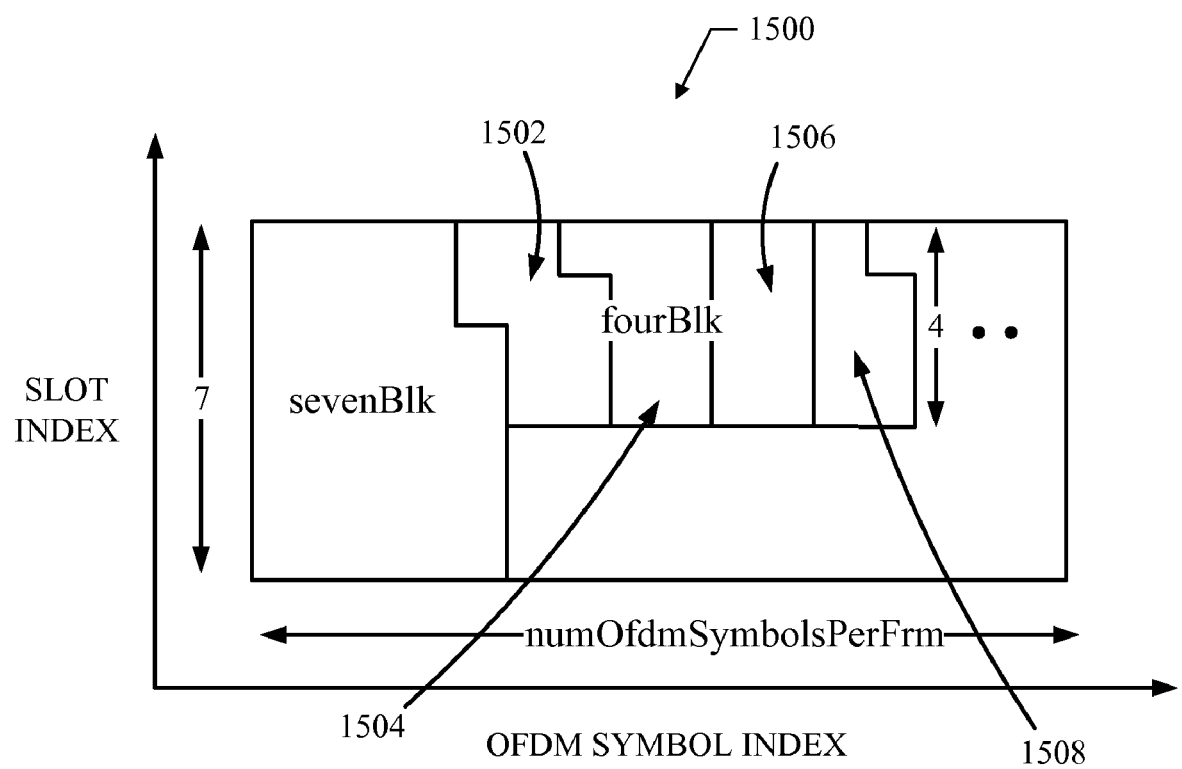
FIG. 15 shows a frame that illustrates the operation of embodiments of an allocation algorithm to pack two RT services in a transmission frame for use in a multiplexing system.

FIG. 15 shows a frame 1500 that illustrates the operation of embodiments of the allocation algorithm to pack two RT services into a transmission from for use in a multiplexing system. In this example, the two RT services namely; service A and B, are packed into a fourblk region of the frame 1500. For the purpose of illustration, it will be assumed that the previous operations have determined that both the RT services are in the fourBlk region. It will also be assumed that both of these RT services have two channels, namely; 1 and 2. It will further be assumed that the number of data slots for each channel is as follows.

Channel 1 of service A=9
Channel 2 of service A=9
Channel 1 of service B=8
Channel 2 of service B=7

As illustrated in the frame 1500, the RT services are packed into the fourblk region according to the following parameters.

Channel 1 Service A (1502)
Start symbol=5
Start slot=6
Lowest slot=4
Highest slot=7
Total slots=9

Channel 2 Service A (1504)
Start symbol=7
Start slot=7
Lowest slot=4
Highest slot=7
Total slots=9

Channel 1 Service B (1506)
Start symbol=10
Start slot=4
Lowest slot=4
Highest slot=7
Total slots=8

Channel 2 Service B (1508)
Start symbol=12
Start slot=4
Lowest slot=4
Highest slot=7
Total slots=7

Algorithm Summary

In one or more embodiments, the allocation algorithm provides efficient packing of flows into a frame, thereby minimizing the "wake-up" frequency and "on-time" of a receiving device. For example, grouping channels of a service together reduces wake-up frequency, while transmitting a service at its maxSlotHeight reduces on-time.

In an embodiment, if a slot allocation provided by the algorithm fails because of one of the four inequality conditions, the algorithm passes on directives to the resizing controller 212 that controls how services are resized. If the resizing controller 212 has services resized based on these directives, a packing solution is guaranteed.

Figure 16:
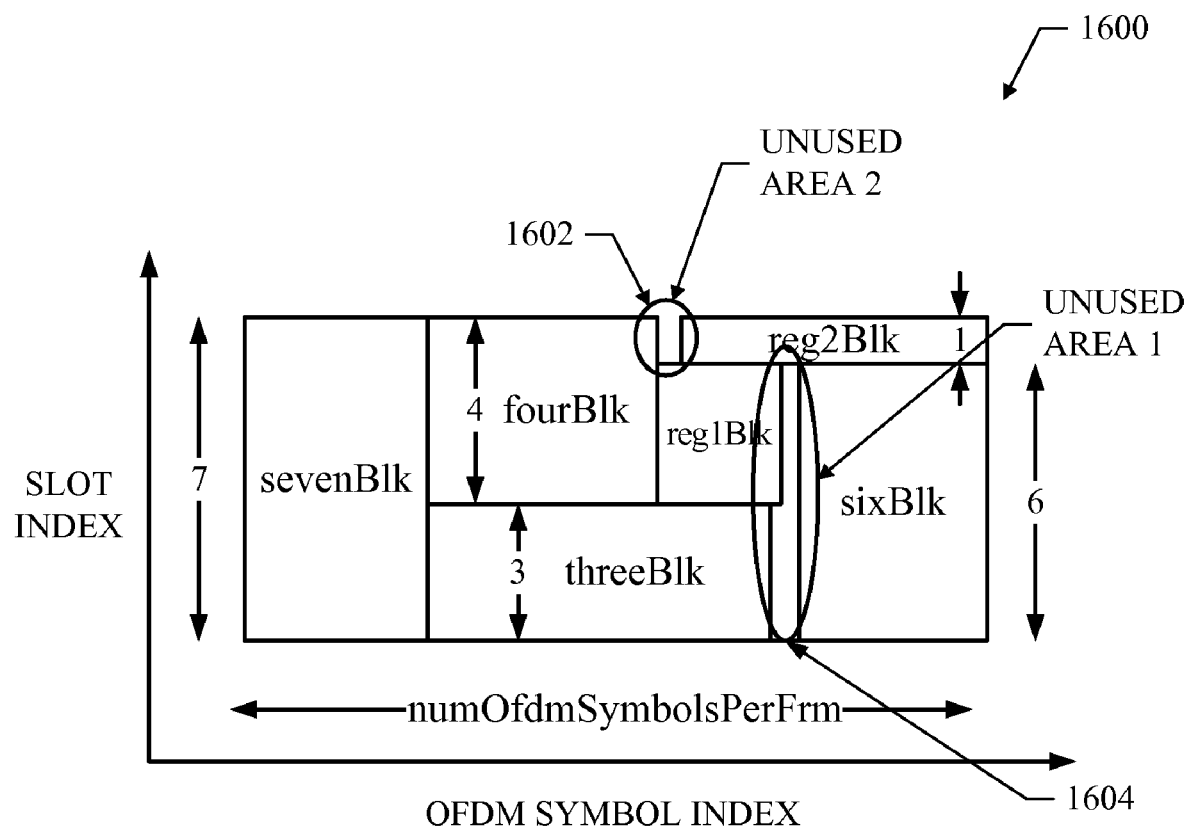
FIG. 16 shows a frame that illustrates the operation of an embodiment of an allocation algorithm to pack RT services in such a way that unused slots are grouped in two areas.

FIG. 16 shows a frame 1600 that illustrates the operation of an embodiment of an allocation algorithm to pack RT services in such a way that unused slots are grouped in two areas. Collecting unused slots in fewer areas ensures better utilization of these slots by services that are lower in priority than the services that were input to the allocation algorithm. In an embodiment, ORT services may be packed into these areas. For example, in the frame 1600, the unused slots are groups in areas 1602 and 1604.

Real-Time Service Resizing Algorithm

In one or more embodiments, the resize controller 116 operates to control how services are resized so that they may be packed into a frame. For example, services are resized to adjust their associated delivery requirements. In an embodiment, one or more services are resized to reduce associated bandwidth requirements; however, the resize controller 116 operates to resize services to adjust any of the associated delivery requirements. The following description describes a resizing algorithm that operates to resize component streams in RT services. The conditions which give rise to the resizing of RT services are also provided. In an embodiment, the resize controller 116 operates to implement a resizing algorithm that determines resizing parameters. These parameters are then transmitted to the RTMS associated with the RT services in a resizing request. The RTMS then operates to resize the identified RT services according to the parameters in the resizing request.

It should also be noted that the resize controller 116 also operates to resize any ORT service. For example, the resize controller 116 is operable to determine how one or more ORT services should be resized and communication with any NRTMS to implement the determined resizing. As a result, delivery requirements associated with those services will be adjusted. For example, the resize controller 116 may communicate with a NRTMS to reduce the bandwidth requirement of an ORT service thereby adjusting its delivery requirements. Thus, the embodiments described herein with reference to resizing RT services are equally applicable to ORT services as well.

As shown in FIG. 1, the MUX 114 receives content flow data, and associated signaling data from the RTMS 126 and NRTMS 128. Every superframe, the MUX 114 negotiates data bandwidth with the RTMS 126 for all the active real time services and optionally with the NRTMS 128 for ORT services. In an embodiment, the bandwidth negotiation involves the following sequence of operations.

a. The MUX 114 sends a GetDataSize.Request message to the RTMS 126 to request data sizes for RT services to be sent in a superframe.

b. The RTMS 126 sends a GetDataSize.Response message to the MUX 114 specifying data sizes for the RT services to be sent in a superframe.

c. The MUX 114 performs content scheduling (alllocations) based on all the received data sizes from the RTMS 126 as well as from other sources.

d. The MUX 114 sends the updated sizes for the RT services flow data to the RTMS 126 as part of an UpdateDataSize.Notification message.

In an embodiment, the MUX 114 operates to provide a content scheduling function that comprises embodiments of the slot allocation algorithm described above. The resize controller 116 provides embodiments of a resizing algorithm. The slot allocation algorithm is responsible for fitting the slots (rate) allocated to all the media services in a superframe. Certain systems constraints (e.g. peak throughput of the turbo decoder on the device limits the number of slots that can be assigned to a particular media service in a single OFDM symbol) can cause the slot allocation procedure to fail in spite of the total assigned slots being less than or equal to the total available slots in a superframe. Also, the real-time service component that is expected to dominate demand for air-link resources is video content. This content is compressed using source coding which results in a highly variable bit-rate flow. Finally, the capacity per superframe available for transmission of real time services may vary due to requirements of other concurrent media services. These factors lead to one of the following allocation conditions to occur.

1. The sum of all the data requested by the RT services is less than or equal to the available capacity and the slot allocation algorithm succeeds.
2. The sum of all the data requested by the RT services is less than or equal to the available capacity but the slot allocation algorithm fails.
3. The sum of all the data requested by the RT services is more than the available capacity.

The allocation conditions 2 and 3 result in failure to allocate the amount of data requested by the RT service flows. In these scenarios, the MUX 114 invokes the resize controller 116 to perform a resize algorithm to resize RT services. The next section explains the concept of quality for the real time services and the objective of embodiments of the resize algorithm.

Real Time Service Quality and Resize Algorithm Objective

The concept of quality is associated with the video flows within a real time streaming media service. The quality (Q) of a real-time service is a function of the bit rate (r) allocated to the service flows and is modeled by a quality function expressed as;

$$Q=f(r) \quad (3)$$

Every superframe, the RTMS 126 provides information which helps the MUX 114 evaluate this function. This is sent to the MUX 114 in the GetDataSize.Response message. As explained in the following sections, the MUX 114 uses this information for quality estimation of the real time service facilitating the resize procedure. It should also be noted that any selected quality measurement or characteristic can be used by the MUX 114 for quality estimation purposes.

The resize algorithm assigns rates (in units of physical layer packets (PLPs)) to the real time services such that the total allocated rate is less than or equal to the available capacity for RT services so that the slot allocation algorithm succeeds. Thus, in an embodiment, the rate assignment for RT services should be such that the quality function of the RT service video flows is in proportion to their weights according to the following.

$$(Q_i/Q_j)=(W_i/W_j) \quad (4)$$

where $Q_i$ ($W_i$) and $Q_j$ ($W_j$) are quality functions (flow weights) for any RT services i, j. The quality function is estimated using equation (3) above. The weight value associated with a flow gives a measure of the relative significance of that flow amongst the other RT video flows. In an embodiment, the MUX 114 obtains these flow weight values from a Subscription and Provisioning Sub-system, which may also be responsible for service planning and management functions associated with a distribution network.

Resize Algorithm

This section explains embodiments of the RT service resize algorithm. The algorithm uses an iterative approach to converge to a rate assignment for the video component streams (flows) in the RT services. The algorithm begins with the number of PLPs (rate) requested by each video stream. Each of the iterations of the algorithm involves identifying a candidate service for rate reduction. The candidate stream is one that is least sensitive to rate reduction and does not suffer an unfavorable reduction in quality in comparison with the other streams. In an embodiment, the functions of the resize algorithm are provided by the resize controller 212 shown in FIG. 2.

After a candidate stream is identified, the rate allocated to that stream is reduced. For example, the rate may be reduced by an amount corresponding to two Reed-Solomon code blocks. The network assigns rates to all services with a granularity defined by the number of PLPs corresponding to one Reed-Solomon block. The video streams are assumed to be transmitted using one of the network's layered transmit modes with base and enhancement video components. In addition, the system constrains the data in the two video components to be equal. Hence, the choice of two Reed-Solomon blocks as the unit of rate reduction. However, it should be noted that it is within the scope of the embodiments to reduce the rate of a stream by any other selected amount.

Constants

The following constant parameters are used in embodiments of a multiplexing system to provide a resize function.

rateReductionBnd
The upper bound on the fractional reduction in rate for any real time video stream. The bound is in reference to the rates requested by the streams. In an embodiment, a value of 0.5 is used.

sysMin
A minimum value for a stream's quality. It is used to prevent streams that have reached the rate reduction bound from further reduction in rate.

payloadPLP Effective payload for a PLP, which is approximately 968 bits.

Algorithm Inputs

The following inputs are used in embodiments of a multiplexing system to provide a resize function.

maxRTSOFDMSym
Capacity in number of OFDM symbols per superframe available for the real time services.

numRTS Number of real time services sharing the available capacity.

numVStreams
The total number of video component streams in the real time services. For example, VStream is a list of structures describing each real time video component stream.

_weight Holds the relative weight value for the stream.

requestedPLPs
Holds the number of PLPs per superframe requested by the stream. It is possible to estimate the raw number of bits requested as requestedPLPs×payloadPLP (968 bits).

rsCodeParameterK
Parameter K for a Reed Solomon (N,K) code.

Variables

The following variables are used in embodiments of a multiplexing system to provide a resize function.

reqPLPs [numVStreams]
    Array indexed by a number (0 to numVStreams-1) identifying the video component stream. The array holds the number of PLPs per superframe requested by this stream as indicated by the requestedPLPs member of the VStream structure.

assgnPLPs [numVStreams]
    Array indexed by a number (0 to numVStreams-1) identifying the video component stream. The array holds the number of PLPs per superframe assigned to this stream.

tempPLPs [numVStreams]
    Array indexed by a number (0 to numVStreams-1) identifying the video component stream. The array holds the number of PLPs per superframe assigned to the video component stream. This is a temporary variable used internally by the algorithm.

weight [numVStreams]
    Array indexed by a number (0 to numVStreams-1) identifying the video component stream. The array holds the relative weight value of the stream indicated by the _weight member of the VStream structure.

effQuality [numVStreams]
    Array indexed by a number (0 to numVStreams-1) identifying the video component stream. The array holds the estimated quality for the real time service stream.

PLPsPerRSBlk [numVStreams]
    Array indexed by a number (0 to numVStreams-1) identifying the video component stream. The array holds the number of data PLPs per Reed-Solomon code block as indicated by the rsCodeParameterK member of the VStream structure.

Algorithm Outputs
The following outputs are used in embodiments of a multiplexing system to provide a resize function.

successFlag
    A flag set to 1 if the resize algorithm succeeds in converging to a rate assignment that satisfies the constraints. Otherwise, the successFlag is set to 0.

Internal Procedures Called by the Resize Algorithm
The following is an internal procedure called by the resize algorithm in embodiments of a multiplexing system.
reducePLPs ( )
    A procedure that identifies a video stream for rate reduction and reduces the amount of data allocated to that stream. This procedure shares the variables space as defined for the main routine.

External Algorithm Called by the Re-Encode Algorithm
The following is an external procedure called by the resize algorithm in embodiments of a multiplexing system.
slotAllocation
    Slot allocation algorithm is responsible for fitting the slots (rate) allocated to all the media services in a superframe. The resize algorithm calls the slot allocation algorithm with the required input arguments including allocated data (rate) for all media services.

Algorithm
The following is a description of an embodiment of a resize algorithm for use in embodiments of a multiplexing system. In an embodiment, the resize controller 212 implements the resize algorithm and performs one or more of the following functions.
a. Using VStream structure data, populate the arrays reqPLPs[ ], qualityIndex[ ], PLPsPerRSBlk[ ], and weight[ ].
b. Initialize all elements of array assgnPLPs[ ] to corresponding elements in reqPLPs[ ].
c. Initialize an algorithmFlag=1, and a successFlag=0.
d. Perform the following functions:

```
while algorithm Flag == 1
    reducePLPs( )
    if reduction> 0
        call slotAllocation Algorithm
        if slotAllocation Algorithm succeeds
            algorithmFlag = 0
            success Flag = 1
        endif
    else
        /* This condition signifies a failure to resize while respecting the
        rateReductionBnd bound..*/
    endif
endwhile
```

The following functions are performed as part of the reducePLPs( ) procedure.

```
for i = 0 to numVStreams
    tempPLPs[i] = assgnPLPs[i]
    tempPLPs[i] = tempPLPs[i] - 2 x PLPsPerRSBlk[i]
/* PLPs allocated to a stream are reduced by an amount corresponding to
two Reed-Solomon blocks. In an embodiment, one RS block is removed
from both base and enhancement components. The system constrains the
data in base and enhancement video components to be equal. */
    if tempPLPs[i] / reqPLPs[i] > = rateReductionBnd
        effQuality[i] = f(tempPLPs[i] x payloadPLP) /
            weight[i]
    else
        effQuality[i] = sysMin
    endif
endfor
/* where f( ) is any suitable function that may be used to
evaluate quality */
``` e. Identify the index of the service with maximum effective quality as given by the array effQuality[ ]. Set the _index parameter to that value.
f. Perform the following functions.

if effQuality[_index]=sysMin

```
/* This condition signifies failure to resize while respecting the
rateReductionBnd bound. */
    reduction = -1
else
    reduction = 2 x PLPsPerRSBlkLindex]
    assgnPLPsLindex] = tempPLPsLindex]
endif
```

Thus, the resize controller 212 operates to provide the above functions to resize services in embodiments of a multiplexing system. For example, the rate of a RT service is reduced to allow the service to be allocated to the available slots of a superframe as provided by embodiments of the allocation algorithm described above.

Other than Real Time Services (ORTS)
Embodiments of the slot allocation algorithm are described above that take into account various constraints and ensures that the number of turbo packets sent for a service in an OFDM symbol is decodable by a device. This algorithm is preferable for RT Services since the device is required to receive only one RT service at any time. However, a device might be receiving multiple ORT services in a superframe. If the same algorithm is used, the total number of packets for all the ORT services subscribed to by the device in an OFDM symbol may become greater than the device limit. This is termed a "turbo packet conflict." A turbo packet conflict leads to the loss of ORT service data. The magnitude of the loss depends generally on the subscription pattern of the user. Thus, additional embodiments of the slot allocation algorithms for ORT services are provided and described below that will completely eliminate turbo packet conflicts.

Figure 17:
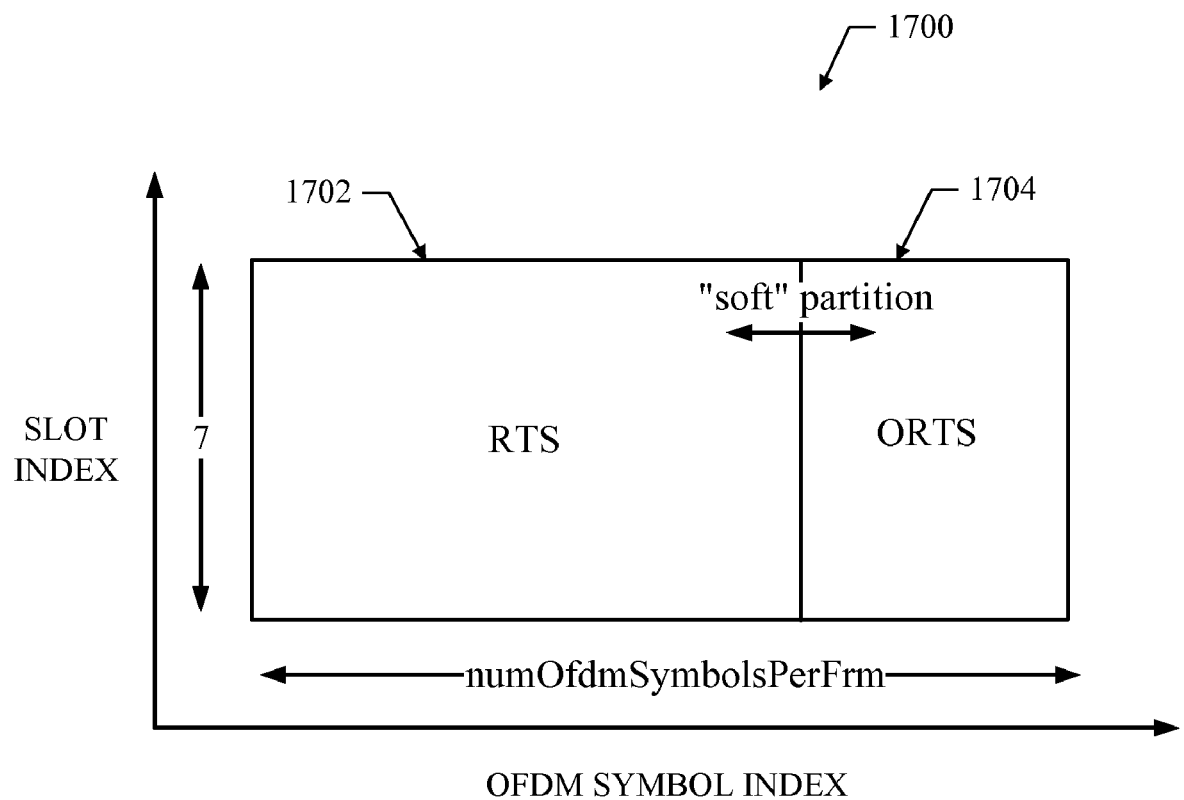
FIG. 17 shows an embodiment of a frame that is divided into regions for RT services and ORT services for use in a multiplexing system.

FIG. 17 shows an embodiment of a frame 1700 that is divided into regions for RT services and ORT services for use in a multiplexing system. A first region 1702 is provided for RT services, and a second region 1704 is provided for ORT services. Partitioning the frame into these regions will ensure that there is no turbo packet conflict between RT and ORT services. The partition between the RT 1702 and ORT 1704 regions is a "soft" partition (i.e., it varies from superframe to superframe depending on the available RT and ORT service data in that superframe). RT services are slot allocated in the RT service region 1702 using embodiments of the slot allocation algorithm and the resize algorithm described above. ORT services are slot allocated in the ORT service region 1704 using embodiments of an ORT service algorithm described below. In one or more embodiments, the ORT services are also resized to fit into the available bandwidth. A more detailed description of resizing applied to ORT services is provided below.

ORT Service Slot Allocation

With respect to a receiving device's power consumption, it is preferable that the height of an MLC allocation be its maxSlotHeight. This minimizes possible "on time" for the device to receive that MLC. However, for ease of packing, all the grouped MLC's of a service are allocated with the same height. Thus, even for the ORT Services, the concept of "maxSlotHeight of a service" is defined as the minimum or smallest of the maxSlotHeight parameters of all the MLC's grouped for that service. For the remainder of this description, a service's height will mean the common height of all the MLC allocations of that service.

Channels of a Service are Grouped Together

In an embodiment, all channels of a service are grouped together so that their allocations are temporally adjacent in the frame. This approach reduces the number of times a device needs to "wake up" to receive different channels of a service, and so this aids the device in reducing power consumption.

ORTS Region is Divided into Blocks

Figure 18:
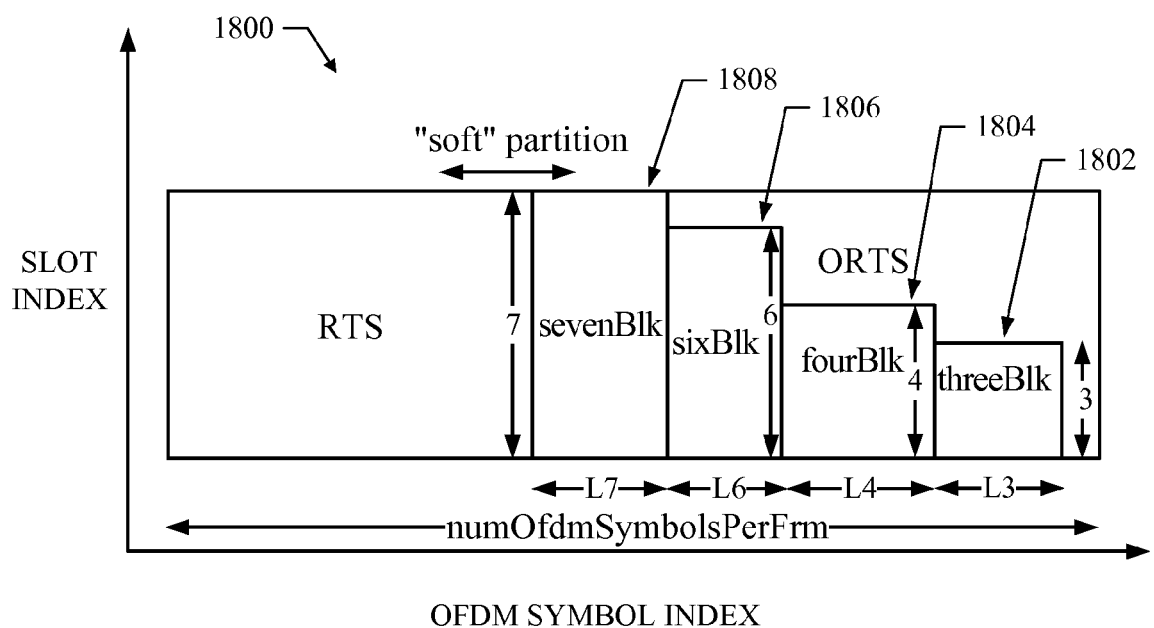
FIG. 18 shows an embodiment of a frame wherein an ORT service region is divided into blocks of different heights.

FIG. 18 shows an embodiment of a frame 1800 wherein an ORTS region is divided into blocks of different heights. In an embodiment, the block heights correspond to the possible maxSlotHeights a service can take. From the Table 500 it can be seen that there are four maxSlotHeights (i.e., 3, 4, 6 and 7). Thus, the frame 1800 shows threeBlk 1802, fourBlk 1804, sixBlk 1806, and sevenBlk 1808 regions that are used to allocate associated services. The ORT service slot allocation algorithm then operates to pack services into different blocks based on the maxSlotHeight.

No Block Above Another

In an embodiment, the blocks are arranged in the frame 1800 such that no block is above another. This ensures that no two ORT services have turbo packet conflicts.

ORT Service Slot Algorithm

In one or more embodiments, the following parameters represent inputs to embodiment of the ORT service slot allocation algorithm.

a. The number of slots of data each MLC of a service has for a frame.
b. The maxSlotHeight of each MLC of a service, which is determined by the transmit mode of that MLC.
c. The total number of symbols available (numAvailOrtsSymPerFrm) for the ORT service.

In one or more embodiments, the following parameters represent outputs from the ORT service slot allocation algorithm a. A decision on whether packing is possible.
b. If packing is successful the number of symbols occupied (numOccuOrtsSymPerFrm) by the ORT service.

Figure 19:
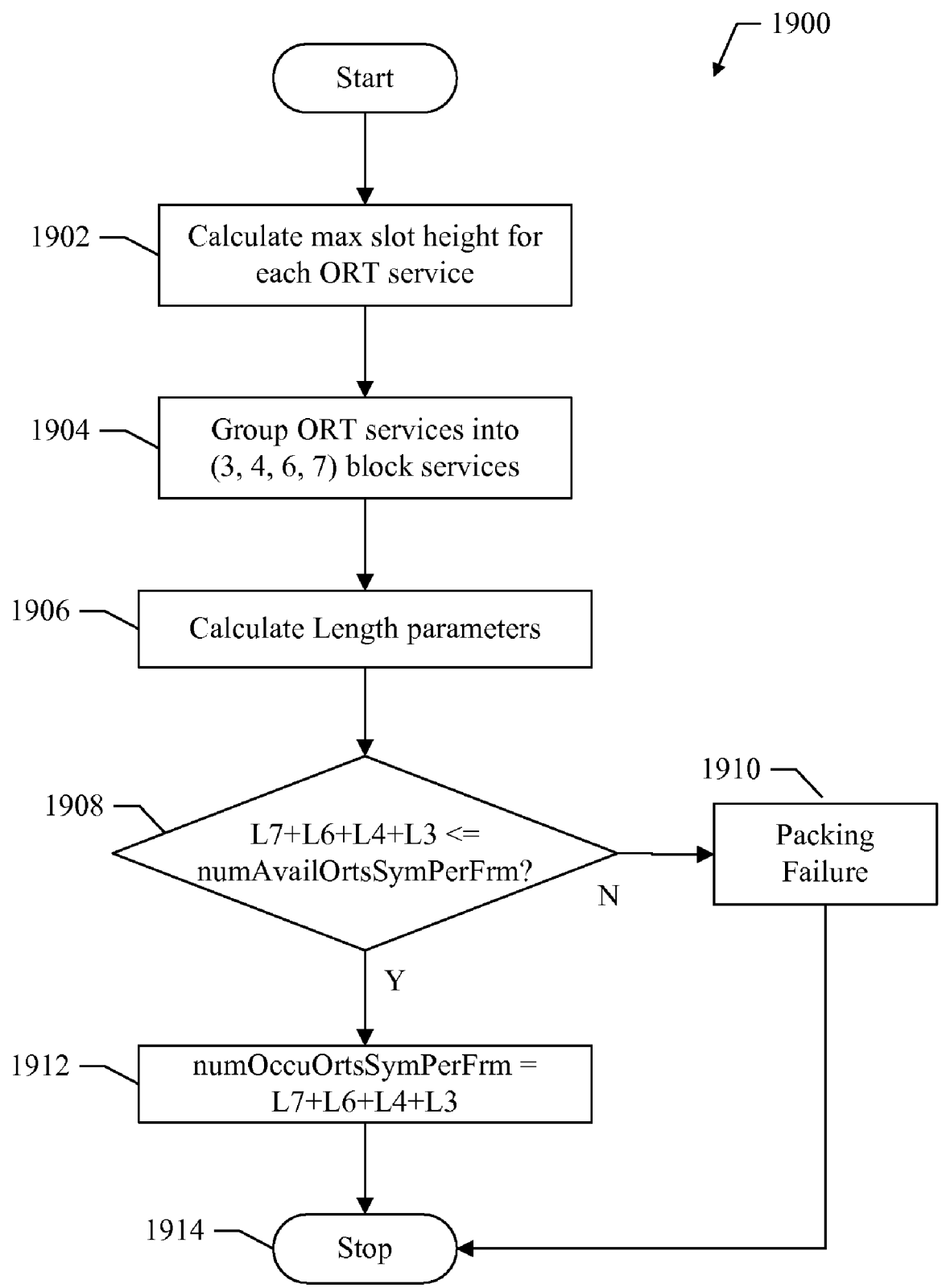
FIG. 19 shows an embodiment of a method for allocating slots to ORT service for use in a multiplexing system.

FIG. 19 shows an embodiment of a method 1900 for allocating slots to ORT services for use in a multiplexing system. In an embodiment, the MUX logic 210 operates to provide the functions of the method 1900 as describe below.

At block 1902, a calculation of the maxSlotHeight of each ORT service is performed. In an embodiment, the MUX logic 210 performs this calculation.

At block 1904, the ORT services are grouped into blocks based on the maxSlotHeight parameters for each service. For example, in an embodiment, the services are grouped into threeBlkSrvcs, fourBlkSrvcs, sixBlkSrvcs, and sevenBlkSrvcs. In an embodiment, the MUX logic 210 performs this operation.

At block 1906, the length variables L7, L6, L4 and L3 are calculated. For example L7=ceil (total slots of all sevenBlkSrvcs/7), where ceil(x) is the smallest integer greater than x. In an embodiment, the MUX logic 210 performs this operation.

At block 1908, a test is performed to determine if the number of required symbols is greater than the number of available symbols. For example, the following inequality is evaluated.

$$(L7+L6+L4+L3 <= numAvailOrtsSymbolsPerFrm)$$

In an embodiment, the MUX logic 210 performs this operation. If the above inequality is false, then the method proceeds to block 1910. If the above inequality is true, then the method proceeds to block 1912.

At block 1910, a packing failure is determined and the method ends at block 1914.

At block 1912, packing is successful and the number of occupied symbols is determined from the following equation.

$$numOccuOrtsSymPerFrm = L7+L6+L4+L3$$

In an embodiment, the MUX logic 210 performs this operation. Once packing is successful, it is easy to arrive at the location of every MLC allocation, since the block that each service belongs to is known.

It should be noted that the method 1900 represents just one implementation and the changes, additions, deletions, combinations or other modifications of the method 1900 are possible within the scope of the embodiments.

Interactions between Slot Allocation and Resize Algorithms

In the previous sections, embodiments of slot allocation and resize algorithms are described. The following sections provide a description of the overall interaction of these algorithms for use in embodiments of a multiplexing system.

Figure 20:
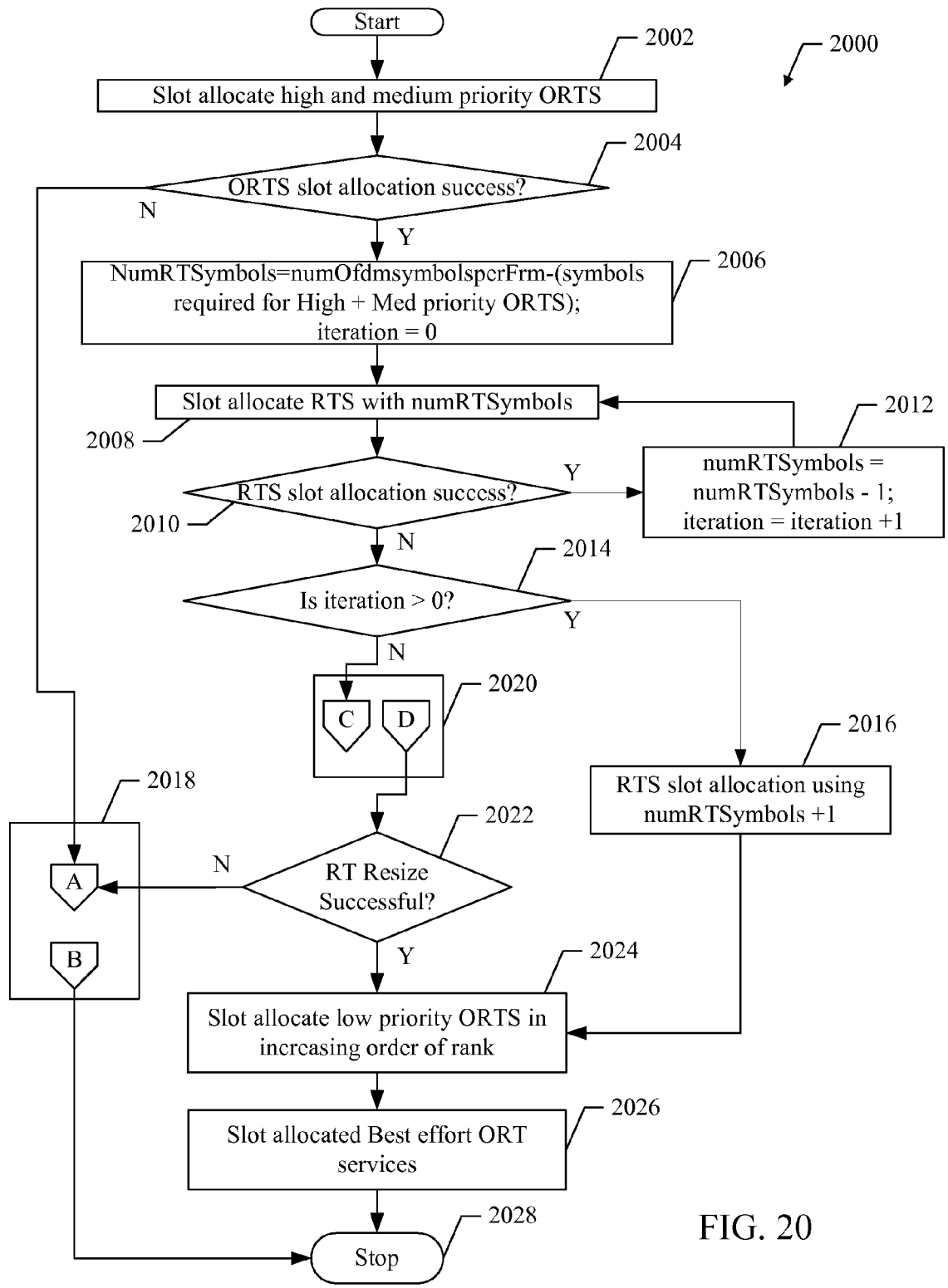
FIG. 20 shows an embodiment of a method for providing slot allocation, resizing, and congestion control for use in a multiplexing system.

FIG. 20 shows an embodiment of a method 2000 for providing slot allocation, resizing, and congestion control for use in a multiplexing system. For example, the server 200 operates to provide the functions described below.

At block 2002, high and medium priority ORT services are slot allocated. For example, every superframe the MUX 114 gets the amount of various flow data and their relative priorities from content entities, such as the RTMS 126 and the NRTMS 128 using the GetDataSize.Response instruction. Using this information, slot allocation for high priority and medium priority ORT services is performed. For example, in an embodiment, the MUX logic 210 operates to perform slot allocation of high and medium priority ORT services according to the above algorithms.

At block 2004, a test is performed to determine if the high and medium priority ORT service slot allocation was successful. If the allocation was successful, the method proceeds to block 2006. If the allocation was not successful, the method proceeds to block 2018.

At block 2018, congestion control is performed. Because the high and medium priority ORT service slot allocation was not successful, the system experiences congestion that needs to be addressed. In an embodiment, the MUX logic 210 performs a congestion control algorithm that is described with reference to FIG. 22. Upon returning from the congestion control the method stops at block 2028.

At block 2006, based on the success of the ORT service slot allocation, the number of symbols available for RT services is computed and an iteration parameter is set to zero. For example, in an embodiment, the MUX logic 210 performs these functions.

At block 2008, slot allocation of RT service is carried out with the remaining symbols in the frame. For example, embodiments of the slot allocation algorithm described above are used to allocate slots to the RT services.

At block 2010, a test is performed to determine if the RT services were successfully allocated. If the allocation was not successful, the method proceeds to block 2014. If the allocation was successful, the method proceeds to block 2012.

At block 2012, the number of available symbols is decreased and the iteration parameter is increased. For example, in an embodiment, the MUX logic 210 performs these functions. The method then proceeds to block 2008 to slot allocated the RT services.

At block 2014, a test is performed to determine if the iteration parameter is greater than zero. For example, in an embodiment, the MUX logic 210 performs these functions. If the iteration parameter is greater than zero, the method proceeds to block 2016. If the iteration parameter is not greater than zero, the method proceeds to block 2020.

At block 2016, RT service slot allocation is performed using the numRTSymbols plus one. For example, the MUX logic 210 performs slot allocation for the RT services using the increased numRTSymbols value. The method then proceeds to block 2024.

At block 2020, selected RT services are resized. In an embodiment, a resize algorithm is used to resize the rate of one or more flow so that a RT service slot allocation can succeed. For example, the resize controller 212 operates to perform a resize algorithm described with reference to FIG. 22. Upon returning from the resize algorithm, the method proceeds to block 2022.

At block 2022, a test is performed to determine if the resize of the RT services was successful. For example, there may be a situation where the resize algorithm fails to achieve a slot allocation with an acceptable lower bound video quality or lower bound resize ratios. If the resize was successful, the method proceeds to block 2024. If the resize was not successful, this situation means that the system is congested, and so the method proceeds to block 2018 to perform congestion control.

At block 2024, low priority ORT services are slot allocated in increasing order of rank. For example, the MUX logic 210 performs this function.

At block 2026, Best Effort ORT service or data is slot allocated. For example, the MUX logic 210 performs this function. The method 2000 then ends at block 2028.

Therefore, at the completion of the method 2000, the MUX 114 has the information on the exact data sizes of various flows that can be sent a superframe. This information is conveyed back to the RTMS 126 and the ORTMS 128 using the UpdateDataSize.Notification message.

It should be noted that the method 2000 represents just one implementation and the changes, additions, deletions, combinations or other modifications of the method 2000 are possible within the scope of the embodiments.

Figure 21:
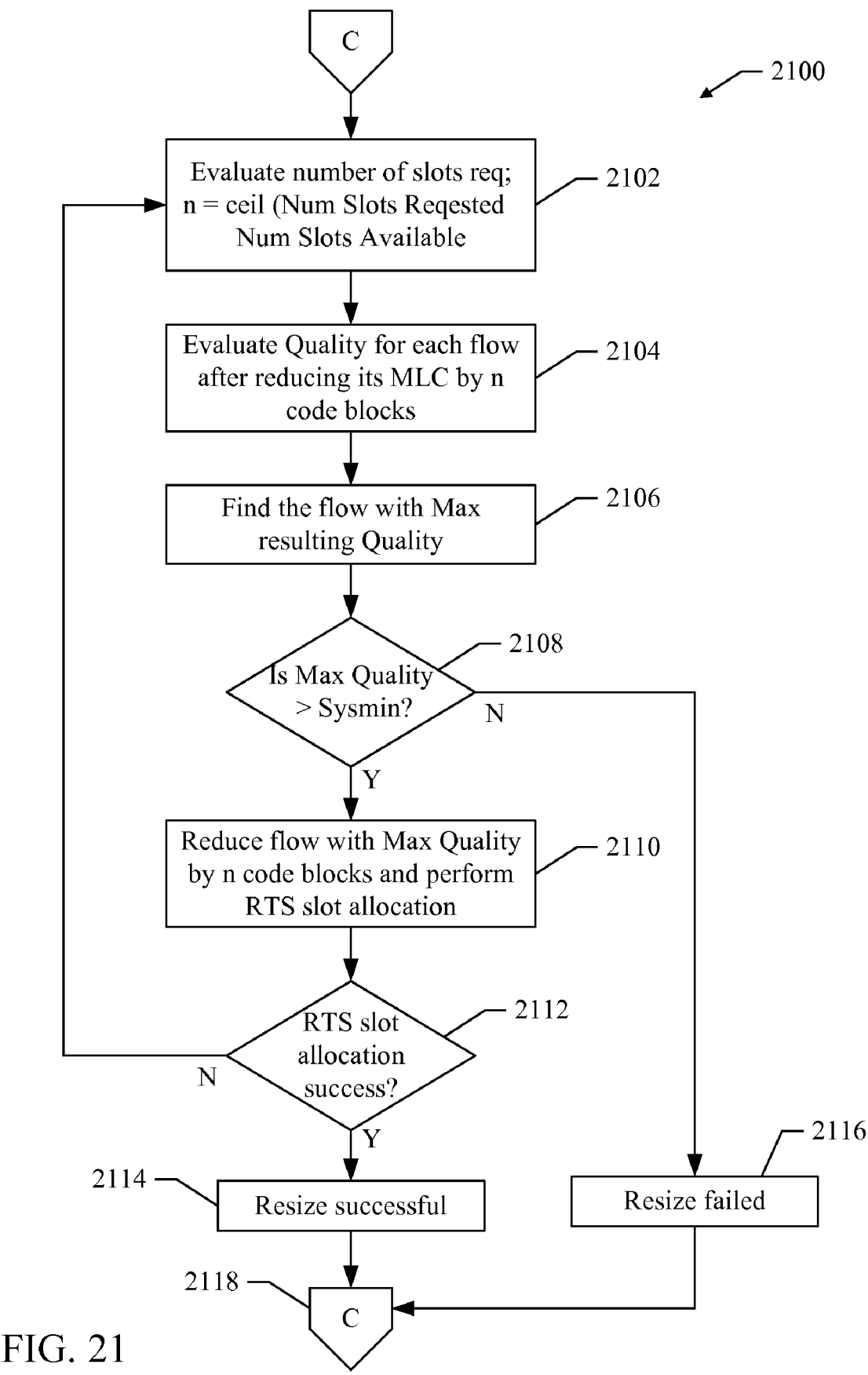
FIG. 21 shows an embodiment of a method for providing resizing of real time services for use in a multiplexing system.

FIG. 21 shows an embodiment of a method 2100 for providing resizing for use in a multiplexing system. For example, the method 2100 is suitable for use as block 2020 in FIG. 2000. In an embodiment, the resize controller 212 operates to provide the functions described below.

At block 2102, the number of slots requested is evaluated and a parameter n is calculated. In an embodiment, n represents a ratio between the number of slots requested for a service and the number of slots available. For example, the resize controller 212 performs this calculation.

At block 2104, the quality of flows to be resized is evaluated. For example, after reducing the MLCs for each flow by n code blocks a quality evaluation is made. For example, the quality (Q) of a service is a function of the bit rate (r) allocated to the service flows and is modeled by the quality function expressed above. For example, the resize controller 212 performs this quality determination.

At block 2106, the flow with the maximum resulting quality is determined (candidate). For example, the resize controller 212 determines the flow with the maximum quality that would result after performing the reduction of code blocks at block 2104.

At block 2108, a test is performed to determine if the maximum quality is greater than a system minimum quality requirement. For example, the resize controller 212 determines the result of this test. If the maximum quality is not greater than the system minimum quality requirement, the method proceeds to block 2116. If the maximum quality is greater than the system minimum quality requirement, the method proceeds to block 2110.

At block 2110, the flow having the maximum quality is resized and slot allocation is performed. For example, the flow having the maximum quality is reduced by n code blocks and slot allocation is performed. For example, the resize controller 212 resizes the flow and requests the MUX logic 210 to perform a slot allocation.

At block 2112, a test is performed to determine if the slot allocation was successful. For example, the resize controller 212 receives an indicator from the MUX logic 210 that indicates whether the slot allocation performed at block 2110 was successful. If the slot allocation was successful, the method proceeds to block 2114. If the slot allocation was not successful, the method proceeds to block 2102.

At block 2114, the resize is determined to be successful, and at block 2116, the resize is determined to have failed. For example, the resize controller 212 makes these determinations. The method then proceeds to block 2118 where the method returns to block 2020 in FIG. 2000.

Therefore, the method 2100 operates to provide resizing for use in a multiplexing system. It should be noted that the method 2100 represents just one implementation and the changes, additions, deletions, combinations or other modifications of the method 2100 are possible within the scope of the embodiments.

Figure 22:
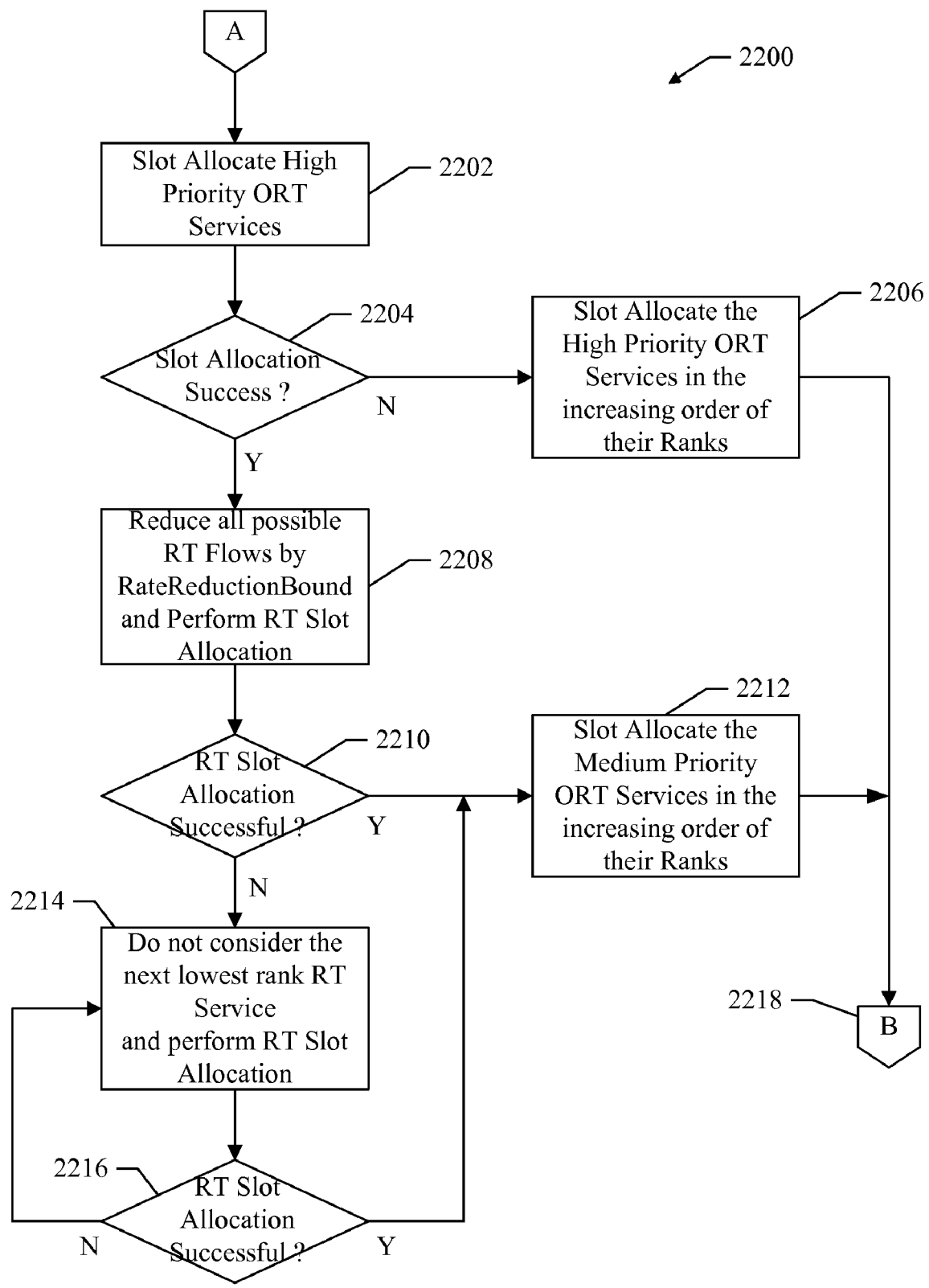
FIG. 22 shows an embodiment of a method for providing congestion control for use in a multiplexing system.

FIG. 22 shows an embodiment of a method 2200 for providing congestion control for use in a multiplexing system. For example, the method 2200 is suitable for use as block 2018 in FIG. 2000. In an embodiment, the MUX 210 operates to provide the functions described below.

At block 2202, high priority ORT services are slot allocated. For example, the MUX 210 performs this allocation according to embodiments of an allocation algorithm described herein.

At block 2204, a test is performed to determine if the allocation performed at block 2202 was successful. For example, the MUX 210 performs this function. If the allocation was a success, the method proceeds to block 2208. If the allocation was not successful, the method proceeds to block 2206.

At block 2206, high priority ORT services are allocated by the increasing order of their rank. For example, the MUX 210 performs this allocation according to embodiments of an allocation algorithm described herein. The method 2200 then ends at 2218.

At block 2208, all possible RT service flows are reduced by a selected amount and slot allocation of those flows is performed. For example, the resize controller 212 and the MUX 210 perform these operations according to embodiments described herein. The selected amount is based on a rate reduction parameter known to the system.

At block 2210, a test is performed to determine if the RT service slot allocation at block 2208 was successful. For example, the MUX 210 performs this function. If the allocation was successful, the method proceeds to block 2112. If the allocation was not successful, the method proceeds to block 2214.

At block 2212, the medium priority ORT services are slot allocated in order of the increasing rank. For example, the MUX 210 performs this allocation according to embodiments of an allocation algorithm described herein. The method 2200 then ends at 2218.

At block 2214, a RT service slot allocation is performed that excludes the next lowest ranked service. For example, the MUX 210 performs this allocation according to embodiments of an allocation algorithm described herein.

At block 2216, a test is performed to determine if the allocation at block 2214 was successful. For example, the MUX 210 performs this function. If the allocation was successful, the method proceeds to block 2212. If the allocation was not successful, the method proceeds back to block 2214 to exclude another service and attempt slot allocation again.

Therefore, the method 2200 operates to provide congestion control for use in a multiplexing system. It should be noted that the method 2200 represents just one implementation and the changes, additions, deletions, combinations or other modifications of the method 2200 are possible within the scope of the embodiments.

Figure 23:
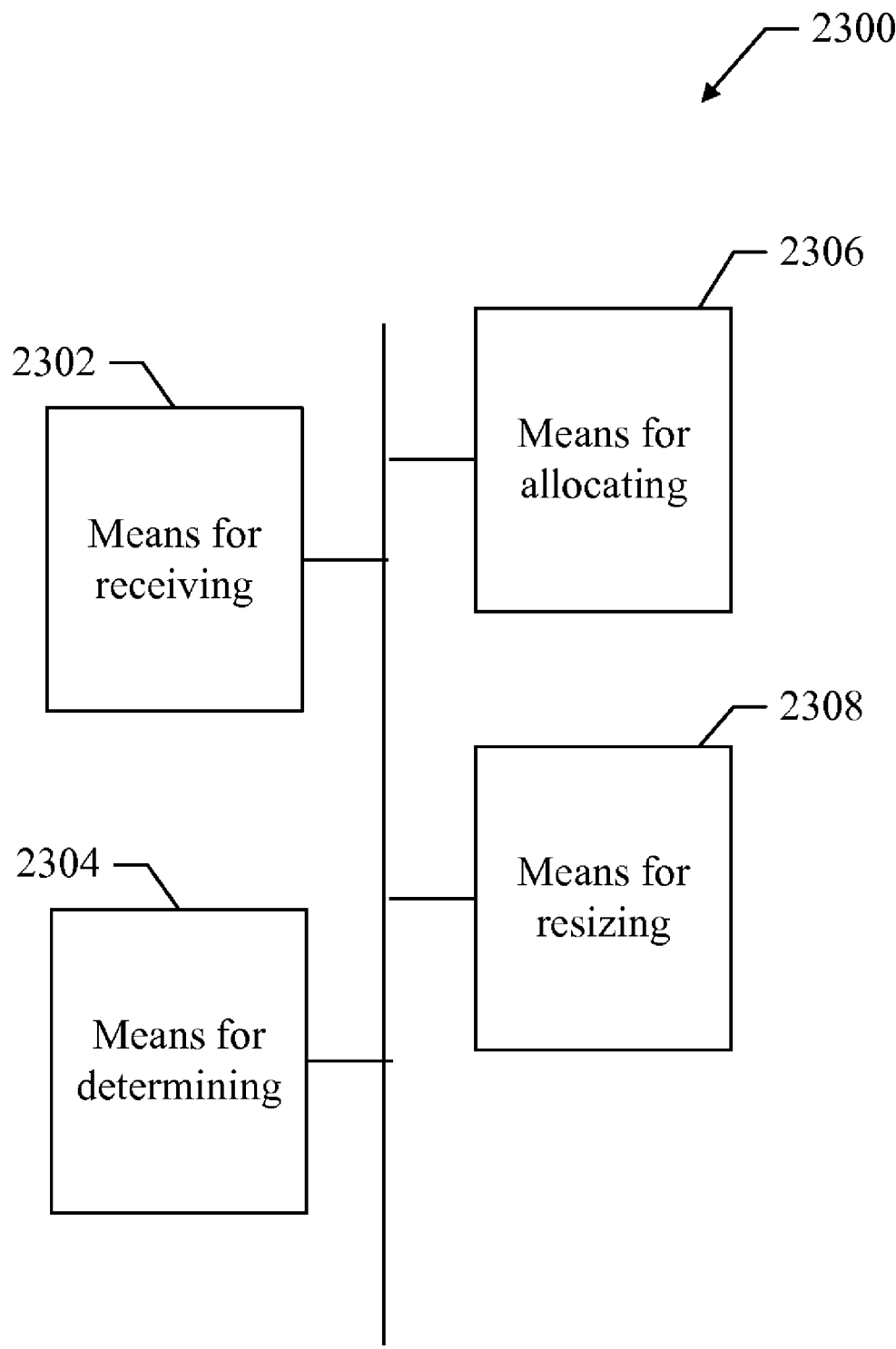
FIG. 23 shows an embodiment of a multiplexing system.

FIG. 23 shows an embodiment of a multiplexing system 2300. The multiplexing system 2300 comprises means (2302) for receiving data, means (2304) for determining bandwidth, means (2306) for allocating data, and means (2308) for resizing data. In an embodiment, the means (2302-2308) are provided by at least one processor executing a computer program to provide embodiment of a multiplexing system as described herein.

Therefore various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while embodiments of a multiplexing system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for transmitting services over a network, the method comprising:
  receiving one or more services having associated delivery requirements;
  determining that network bandwidth is available to meet the delivery requirements;
  allocating the network bandwidth to the one or more services based on the delivery requirements to produce network bandwidth allocations, wherein the allocating comprises:
    determining height parameters associated with the one or mote services;
    grouping the one or more services into one or more groups based on the height parameters;

determining length parameters for the one or more groups; and allocating the network bandwidth to the one or more groups based on the length parameters.

2. The method of claim 1, wherein said receiving comprises receiving the one or more services having the associated delivery requirements, wherein the associated delivery requirements comprise one or more of bandwidth, latency, and priority requirements.

3. The method of claim 1, wherein said allocating comprises:
dividing the network bandwidth into first and second portions; and
allocating the first and second portions to the one or more services, wherein the first portion is allocated to real time services and the second portion is allocated to other than real time services.

4. The method of claim 1, further comprising transmitting the one or more services over an OFDM network using the network bandwidth allocations.

5. Apparatus for transmitting services over a network, the apparatus comprising:
receiving logic configured to receive one or more services having associated delivery requirements;
multiplexer logic configured to determine that network bandwidth is available to meet the delivery requirements, and to allocate the network bandwidth to the one or more services based on the delivery requirements to produce network bandwidth allocations, wherein said multiplexer logic comprises:
logic configured to determine height parameters associated with the one or more services;
logic configured to group the one or more services into one or more groups based on the height parameters;
logic configured to determine length parameters for the one or more groups; and
logic configured to allocate the network bandwidth to the one or more groups based on the length parameters.

6. The apparatus of claim 5, wherein said associated delivery requirements comprise one or more of bandwidth, latency, and priority requirements.

7. The apparatus of claim 5, wherein said multiplexer logic comprises:
logic configured to divide the network bandwidth into first and second portions; and
logic configured to allocate the first and second portions to the one or more services, wherein the first portion is allocated to real time services and the second portion is allocated to other than real time services.

8. The apparatus of claim 5, further comprising transmitting logic configured to transmit the one or more services over an OFDM network using the network bandwidth allocations.

9. Apparatus for transmitting services over a network, the apparatus comprising:
means for receiving one or more services having associated delivery requirements;
means for determining that network bandwidth is available to meet the delivery requirements;
means for allocating the network bandwidth to the one or more services based on the delivery requirements to produce network bandwidth allocations, wherein said means for allocating comprises:
means for determining height parameters associated with the one or more services;
means for grouping the one or more services into one or more groups based on the height parameters;
means for determining length parameters for the one or more groups; and
means for allocating the network bandwidth to the one or more groups based on the length parameters.

10. The apparatus of claim 9, wherein said means for receiving comprises means for receiving the one or more services having the associated delivery requirements, wherein the associated delivery requirements comprise one or more of bandwidth, latency, and priority requirements.

11. The apparatus of claim 9, wherein said means for allocating comprises:
means for dividing the network bandwidth into first and second portions; and
means for allocating the first and second portions to the one or more services, wherein the first portion is allocated to real time services and the second portion is allocated to other than real time services.

12. The apparatus of claim 9, further comprising means for transmitting the one or more services over an OFDM network using the network bandwidth allocations.

13. A computer-readable medium having a computer program comprising instructions stored therein, which when executed by at least one processor, operate to transmit services over a network, the computer program comprising:
instructions for receiving one or more services having associated delivery requirements;
instructions for determining that network bandwidth is available to meet the delivery requirements;
instructions for allocating the network bandwidth to the one or more services based on the delivery requirements to produce network bandwidth allocations, wherein said instructions for allocating comprises:
instructions for determining height parameters associated with the one or more services;
instructions for grouping the one or more services into one or more groups based on the height parameters;
instructions for determining length parameters for the one or more groups; and
instructions for allocating the network bandwidth to the one or more groups based on the length parameters.

14. The computer program of claim 13, wherein said instructions for receiving comprise instructions for receiving the one or more services having the associated delivery requirements, wherein the associated delivery requirements comprise one or more of bandwidth, latency, and priority requirements.

15. The computer program of claim 13, wherein said instructions for allocating comprise:
instructions for dividing the network bandwidth into first and second portions; and
instructions for allocating the first and second portions to the one or more services, wherein the first portion is allocated to real time services and the second portion is allocated to other than real rime services.

16. The computer program of claim 13, further comprising instructions for transmitting the one or more services over an OFDM network using the network bandwidth allocations.

17. At least one processor configured to perform a method for transmitting services over a network, the method comprising:
receiving one or more services having associated delivery requirements;
determining that network bandwidth is available to meet the delivery requirements;

allocating the network bandwidth to the one or more services based on the delivery requirements to produce network bandwidth allocations, wherein said allocating comprises:
  determining height parameters associated with the one or more services;
  grouping the one or more services into one or more groups based on the height parameters;
  determining length parameters for the one or more groups; and
  allocating the network bandwidth to the one or more groups based on the length parameters.

18. The method of claim 17, wherein said receiving comprises receiving the one or more services having the associated delivery requirements, wherein the associated delivery requirements comprise one or more of bandwidth, latency, and priority requirements.

19. The method of claim 17, wherein said allocating comprises:
  dividing the network bandwidth into first and second portions; and
  allocating the first and second portions to the one or more services, wherein the first portion is allocated to real time services and the second portion is allocated to other than real time services.

20. The method of claim 17, further comprising transmitting the one or more services over an OFDM network using the network bandwidth allocations.

21. A method for transmitting services over a network, the method comprising:
  receiving one or more services having associated delivery requirements;
  determining that available network bandwidth is not able to meet the delivery requirements;
  resizing at least one of the one or more services to produce adjusted delivery requirements;
  allocating the available network bandwidth to the one or more services based on the adjusted delivery requirements to produce network bandwidth allocations, wherein said allocating comprises:
    determining height parameters associated with the one or more services based on the adjusted delivery requirements;
    grouping the one or more services into one or more groups based on the height parameters;
    determining length parameters for the one or more groups; and
    allocating the available network bandwidth to the one or more groups based on the length parameters.

22. The method of claim 21, wherein said receiving comprises receiving the one or more services having the associated delivery requirements, wherein the associated delivery requirements comprise one or more of bandwidth, latency, and priority requirements.

23. The method of claim 21, wherein said resizing comprises reducing bandwidth requirements of the at least one of the one or more services.

24. The method of claim 21, wherein said allocating comprises:
  dividing the available network bandwidth into first and second portions; and
  allocating the first and second portions to the one or more services, wherein the first portion is allocated to real time services and the second portion is allocated to other than real time services.

25. The method of claim 21, further comprising transmitting the one or more services over an OFDM network using the network bandwidth allocations.

26. Apparatus for transmitting services over a network, the apparatus comprising:
  receiving logic configured to receive one or more services having associated delivery requirements;
  a resize controller configured to resize at least one of the one or more services to produce adjusted delivery requirements
  multiplexer logic configured to determine that available network bandwidth is not able to meet the delivery requirements, and to allocate the available network bandwidth to the one or more services based on the adjusted delivery requirements to produce network bandwidth allocations, wherein said multiplexer logic comprises:
    logic configured to determine height parameters associated with the one or more services based on the adjusted delivery requirements;
    logic configured to group the one or more services into one or more groups based on the height parameters;
    logic configured to determine length parameters for the one or more groups; and
    logic configured to allocate the available network bandwidth to the one or more groups based on the length parameters.

27. The apparatus of claim 26, wherein said associated delivery requirements comprise one or more of bandwidth, latency, and priority requirements.

28. The apparatus of claim 26, wherein said resize controller comprises logic configured to reduce bandwidth requirements of the at least one of the one or more services to produce the adjusted delivery requirements.

29. The apparatus of claim 26, wherein said multiplexer logic comprises:
  logic configured to divide the available network bandwidth into first and second portions; and
  logic configured to allocate the first and second portions to the one or more services, wherein the first portion is allocated to real time services and the second portion is allocated to other than real time services.

30. The apparatus of claim 26, further comprising transmitting logic configured to transmit the one or more services over an OFDM network using the network bandwidth allocations.

31. Apparatus for transmitting services over a network, the apparatus comprising:
  means for receiving one or more services having associated delivery requirements;
  means for determining that available network bandwidth is not able to meet the delivery requirements;
  means for resizing at least one of the one or more services to produce adjusted delivery requirements;
  means for allocating the available network bandwidth to the one or more services based on the adjusted delivery requirements to produce network bandwidth allocations, wherein said means for allocating comprises:
    means for determining height parameters associated with the one or more services based on the adjusted delivery requirements;
    means for grouping the one or more services into one or more groups based on the height parameters;
    means for determining length parameters for the one or more groups; and
    means for allocating the available network bandwidth to the one or more groups based on the length parameters.

32. The apparatus of claim 31, wherein said means for receiving comprises means for receiving the one or more services having the associated delivery requirements, wherein the associated delivery requirements comprise one or more of bandwidth, latency, and priority requirements.

33. The apparatus of claim 31, wherein said means for resizing comprises means for reducing bandwidth requirements of the at least one of the one or more services.

34. The apparatus of claim 31, wherein said means for allocating comprises:
  means for dividing the available network bandwidth into first and second portions; and
  means for allocating the first and second portions to the one or more services, wherein the first portion is allocated to real time services and the second portion is allocated to other than real time services.

35. The apparatus of claim 31, further comprising means for transmitting the one or more services over an OFDM network using the network bandwidth allocations.

36. A computer-readable medium having a computer program comprising instructions, which when executed by at least one processor, operates to transmit services over a network, the computer program comprising:
  instructions for receiving one or more services having associated delivery requirements;
  instructions for determining that available network bandwidth is not able to meet the delivery requirements;
  instructions for resizing at least one of the one or more services to produce adjusted delivery requirements;
  instructions for allocating the available network bandwidth to the one or more services based on the adjusted delivery requirements to produce network bandwidth allocations, wherein said instructions for allocating comprise:
  instructions for determining height parameters associated with the one or more services based on the adjusted delivery requirements;
  instructions for grouping the one or more services into one or more groups based on the height parameters;
  instructions for determining length parameters for the one or more groups; and
  instructions for allocating the available network bandwidth to the one or more groups based on the length parameters.

37. The computer program of claim 36, wherein said instructions for receiving comprise instructions for receiving the one or more services having the associated delivery requirements, wherein the associated delivery requirements comprise one or more of bandwidth, latency, and priority requirements.

38. The computer program of claim 36, wherein said instructions for resizing comprise instructions for reducing bandwidth requirements of the at least one of the one or more services.

39. The computer program of claim 36, wherein said instructions for allocating comprise:
  instructions for dividing the available network bandwidth into first and second portions; and
  instructions for allocating the first and second portions to the one or more services, wherein the first portion is allocated to real time services and the second portion is allocated to other than real time services.

40. The computer program of claim 36, further comprising instructions for transmitting the one or more services over an OFDM network using the network bandwidth allocations.

41. At least one processor configured to perform a method for transmitting services over a network, the method comprising:
  receiving one or more services having associated delivery requirements;
  determining that available network bandwidth is not able to meet the delivery requirements;
  resizing at least one of the one or more services to produce adjusted delivery requirements;
  allocating the available network bandwidth to the one or more services based on the adjusted delivery requirements to produce network bandwidth allocations, wherein said allocating comprises:
  determining height parameters associated with the one or more services based on the adjusted delivery requirements;
  grouping the one or more services into one or more groups based on the height parameters;
  determining length parameters for the one or more groups; and
  allocating the available network bandwidth to the one or more groups based on the length parameters.

42. The method of claim 41, wherein said receiving comprises receiving the one or more services having the associated delivery requirements, wherein the associated delivery requirements comprise one or more of bandwidth, latency, and priority requirements.

43. The method of claim 41, wherein said resizing comprises reducing bandwidth requirements of the at least one of the one or more services.

44. The method of claim 41, wherein said allocating comprises:
  dividing the available network bandwidth into first and second portions; and
  allocating the first and second portions to the one or more services, wherein the first portion is allocated to real time services and the second portion is allocated to other than real time services.

45. The method of claim 41, further comprising transmitting the one or more services over an OFDM network using the network bandwidth allocations.

* * * * *